US 9,575,566 B2

United States Patent
DeBattista et al.

(10) Patent No.: US 9,575,566 B2
(45) Date of Patent: Feb. 21, 2017

(54) TECHNOLOGIES FOR ROBUST TWO-DIMENSIONAL GESTURE RECOGNITION

(71) Applicant: Intel Corporation, Santa Clara, CA (US)

(72) Inventors: Aaron DeBattista, Egham (GB); Michael E. Kounavis, Portland, OR (US)

(73) Assignee: Intel Corporation, Santa Clara, CA (US)

(*) Notice: Subject to any disclaimer, the term of this patent is extended or adjusted under 35 U.S.C. 154(b) by 131 days.

(21) Appl. No.: 14/569,876

(22) Filed: Dec. 15, 2014

(65) Prior Publication Data
US 2016/0170492 A1    Jun. 16, 2016

(51) Int. Cl.
| | |
|---|---|
| G06F 3/01 | (2006.01) |
| G06T 7/00 | (2006.01) |
| G06K 9/00 | (2006.01) |
| G06K 9/32 | (2006.01) |
| G06K 9/46 | (2006.01) |
| G06K 9/50 | (2006.01) |

(52) U.S. Cl.
CPC .......... *G06F 3/017* (2013.01); *G06K 9/00389* (2013.01); *G06K 9/3275* (2013.01); *G06K 9/4614* (2013.01); *G06K 9/50* (2013.01); *G06T 7/0042* (2013.01); *G06T 2207/10004* (2013.01)

(58) Field of Classification Search
CPC .............. G06K 9/40; G06K 9/46; G06K 9/48; G06K 9/00067; G06F 3/01; G06F 3/017
See application file for complete search history.

(56) References Cited

U.S. PATENT DOCUMENTS

| | | | |
|---|---|---|---|
| 8,254,647 B1* | 8/2012 | Nechyba ............ | G06K 9/00248 382/118 |
| 9,354,709 B1* | 5/2016 | Heller ...................... | G06F 3/017 |
| 2002/0150308 A1* | 10/2002 | Nakamura ......... | G06K 9/00201 382/286 |

(Continued)

FOREIGN PATENT DOCUMENTS

| | | |
|---|---|---|
| WO | 2010008835 A1 | 1/2010 |
| WO | 2014/200454 A1 | 12/2014 |

OTHER PUBLICATIONS

Yi-Qing Wang, An Analysis of the Viola-Jones Face Detectiion Algorithm, Jun. 26, 2014, Image Processing on Line, p. 129.*

(Continued)

*Primary Examiner* — Kent Chang
*Assistant Examiner* — Nathan Brittingham
(74) *Attorney, Agent, or Firm* — Grossman, Tucker, Perreault & Pfleger, PLLC

(57) ABSTRACT

Technologies for performing two-dimensional gesture recognition are described. In some embodiments the technologies include systems, methods, and computer readable media for performing two-dimensional gesture recognition on one or more input images. In some embodiments the technologies use an object detector to detect one or more suspected gestures in an input image, and to generate a first set of hits correlating to detected gestures in the input image. At least a portion of false positive hits may then be removed by the application of one or more filters to the first set of hits. Custom hand gesture filters are also described.

25 Claims, 7 Drawing Sheets

(56) References Cited

U.S. PATENT DOCUMENTS

| | | | |
|---|---|---|---|
| 2007/0110319 A1* | 5/2007 | Wyatt | G06K 9/40 382/199 |
| 2007/0252898 A1 | 11/2007 | DeLean | |
| 2009/0103780 A1 | 4/2009 | Nishihara et al. | |
| 2009/0274389 A1* | 11/2009 | Yamamoto | H04N 5/57 382/274 |
| 2011/0211073 A1* | 9/2011 | Foster | H04N 5/232 348/164 |
| 2011/0291925 A1* | 12/2011 | Israel | G06F 3/017 345/157 |
| 2011/0304541 A1 | 12/2011 | Dalal | |
| 2012/0314902 A1* | 12/2012 | Kimura | G06F 3/017 382/103 |
| 2013/0033530 A1* | 2/2013 | Gamache | G09G 3/3607 345/691 |
| 2014/0157210 A1* | 6/2014 | Katz | G06F 3/017 715/863 |
| 2014/0198031 A1* | 7/2014 | Xiong | G06K 9/00389 345/156 |
| 2014/0306877 A1* | 10/2014 | Katz | G06F 3/017 345/156 |
| 2015/0269425 A1* | 9/2015 | Mazurenko | G06K 9/00355 382/103 |
| 2016/0078289 A1* | 3/2016 | Michel | G06K 9/00389 345/156 |
| 2016/0170492 A1* | 6/2016 | DeBattista | G06F 3/017 345/156 |

OTHER PUBLICATIONS

International Search Report and Written Opinion received for PCT Application No. PCT/US2015/060642, mailed Feb. 26, 2016, 12 pages.
Chai, et al., "Homogeneity Based Background Subtraction for Robust Hand Pose Recognition: Focusing on the Digital Game Interface", Computer Graphics, Imaging and Visualisation, 2007, pp. 292-297.
Ng, et al., "Gesture Recognition via Pose Classification", vol. 3, IEEE publication 0-7695-0750-6/00, 2000, pp. 699-704.
Chang, et al., "Hand Pose Recognition Using Curvature Scale Space", IEEE Publication 1051-4651/02, 2002, 4 pages.
Chen, et al., "Multiple-Angle Hand Gesture Recognition by Fusing SVM Classifiers", IEEE Conference on Automation Science and Engineering, 2007, pp. 527-530.
Cheng, et al., "Pixel-level Hand Detection in Ego-Centric Videos", IEEE Conference on Computer Vision and Pattern Recognition (CVPR), 2013, pp. 3570-3577.
Dadgostar, et al., "Modeling and Recognition of Gesture Signals in 2D Space: A comparison of NN and SVM Approaches", IEEE International Conference on Tools with Artificial Intelligence, 2006, pp. 701-704.
Dawod, et al., "Adaptive Skin Color Model for Hand Segmentation", Computer Applications and Industrial Electronics (ICCAIE), 2010, pp. 486-489.
Dollar, et al., "Fast Feature Pyramids for Object Detection", Submission to IEEE Transactions on Pattern Analysis and Machine Intelligence, 2014, 14 pages.
Ephraim, et al., "Optimizing Viola-Jones Face Detection for Use in Webcams", 2008, 11 pages.
Feng, et al., "Static Hand gesture Recognition based on HOG Characters and Support Vector Machines", International Symposium on Instrumentation and Measurement, Sensor Network and Automation (IMSNA), 2013, pp. 936-938.
Froba, et al., "Face Detection with the Modified Census Transform", IEEE International Conference on Automatic Face and Gesture Recognition (FGR'04), 2004, 6 pages.
Isaacs, et al., "Optimized Wavelet Hand Pose Estimation for American Sign Language Recognition", vol. 1, Jun. 2004, pp. 797-802.
Jones, et al., "Statistical Color Models with Applications to Skin Detection", IEEE Publication, Jun. 1999, 23 pages.
Kolsch, et al., "Analysis of Rotational Robustness of Hand Detection With a Viola-Jones Detector", vol. 3, Aug. 2004, pp. 107-110.
Lienhart, et al., "Empirical Analysis of Detection Cascades of Boosted Classifiers for Rapid Object Detection", MRL Technical Report, May 2002, 7 pages.
Mihalache, et al., "Hand Pose Estimation Using HOG Features from RGB-D Data", IEEE publication 978-1-4799-2228-4/13, 2013, pp. 356-361.
Minnen, et al., "Towards Robust Cross-User Hand Tracking and Shape Recognition", IEEE International Conference on Computer Vision, Workshops, 2011, pp. 1235-1241.
Mo, et al., "Real-time Hand Pose Recognition Using Low-Resolution Depth Images", IEEE Computer Society Conference on Computer Vision and Pattern Recognition, 2006, 7 pages.
Morerio, et al., "Hand Detection in First Person Vision", International Conference on Information Fusion, 2013, pp. 1502-1507.
Nagi, et al., "Max-Pooling Convolutional Neural Networks for Vision-based Hand Gesture Recognition", IEEE International Conference on Signal and Image Processing Applications, 2011, pp. 342-347.
Papageorgiou, et al., "A General Framework for Object Detection", International Conference on Computer Vision, 1998, pp. 555-562.
Schwarz, et al., "Segment-based Hand Pose Estimation", IEEE Canadian Conference on Computer and Robot Vision, 2005, pp. 42-49.
Serra, et al., "Hand Segmentation for Gesture Recognition in EGO-Vision", Proceedings, ACMIMMPD, 2013, pp. 31-36.
Sorce, et al., "Real-Time Hand Pose Recognition Based on a Neural Network Using Microsoft Kinect" IEEE International Conference on Broad band, Wireless Computing, Communication and Applications, 2013, pp. 344-350.
Suryanarayan, et al., "Dynamic Hand Pose Recognition Using Depth Data", International Conference on Pattern Recognition, 2010, pp. 3105-3108.
Takimoto, et al., "Classification of Hand Postures Based on 3D Vision Model for Human-Robot Interaction", IEEE International Symposium on Robot and Human Interactive Communication, 2010, pp. 292-297.
Tofighi, et al., "Hand Posture Recognition Using K-NN and Support Vector Machine Classifiers Evaluated on Our Proposed Hand Reader Dataset", IEEE publication 978-1-4673-5807-1/13, 2013, pp. 1-5.
Viola, et al., "Robust Real-Time Object Detection", International Workshop on Statistical and Computational Theories of Vision-Modeling, Learning, Computing and Sampling, 2001, 30 pages.
Xu et al., "Hand Pose Estimation from a Single Depth Image", IEEE International Conference on Computer—Vision (ICCV), 2013, pp. 3456-3462.
Yin, X., "Hand Gesture Segmentation, Recognition and Application", IEEE International Symposium on Computational Intelligence in Robotics and Automation, 2001, pp. 438-443.
Zhao, et al., "A Real-time Hand Gesture Recognition Method", IEEE Publication 978-1-4577-0321-8/11, 2011, pp. 2475-2478.

* cited by examiner

TECHNOLOGIES FOR ROBUST TWO-DIMENSIONAL GESTURE RECOGNITION

FIELD

The present disclosure generally relates to two-dimensional gesture recognition and, in particular, to technologies for two-dimensional gesture recognition using an object detector and one or more filters. Devices, systems and methods using such technologies are also described.

BACKGROUND

Over the past several decades electronic devices such as computers, mobile computing devices (e.g., smart phones), smart televisions, etc. have increasingly become integrated into modern society. In a typical use case, a user may interact with an electronic device using an input device such as a touch screen, computer mouse, keyboard, buttons etc. Although such input devices are useful, their functionality and/or form factor may make them unsuitable or not-optimal for use with certain devices. For example, many smart phone companies have eschewed the use of hardware buttons on smart phones, in part because the use of such buttons may impose meaningful design constraints in that context.

With the foregoing in mind interest has grown in the development of other technologies for interacting with electronic devices. In particular, interest has grown in the use of gestures to control one or more functions of an electronic device. In this regard several gesture recognition technologies have been developed to enable an electronic device to recognize one or more gestures made by a user of the device, and to perform commands associated with the recognized gesture.

In some gesture recognition technologies a two-dimensional image is segmented so as to isolate a portion of the image containing a gesture from the background. In some instances segmentation is performed using color-based techniques (e.g., by identifying certain skin tones) and/or by depth-based techniques (e.g., using a time of flight camera or a stereo camera). Once the portion image containing the gesture is isolated from the background, a classifier is then applied to classify the gesture (e.g., the hand pose in the image) from a set of classes. In some instances, such classification is performed using a support vector machine, a neural network, and/or region/shape-based analysis techniques.

Although existing gesture recognition technologies have shown some promise, various problems can limit their practical usefulness in real world applications. For example, segmentation of the two-dimensional image may not always be successful due to the difficulty in computing a reliable skin model and/or because depth data is not available. Isolation of the portion of the image containing the gesture from the background can also be unreliable in instances where the background contains significant motion, and/or in instances where a body part making a gesture overlaps another body part having similar color characteristics (e.g., when a hand overlaps a face of a user). As a result, such systems may fail to detect a gesture made by a user, produce unreliable results, and/or present a less than optimal end user experience. Such systems may also consume relatively large amounts of electrical power, potentially rendering them unsuitable for low power applications.

DETAILED DESCRIPTION

Figure 1:
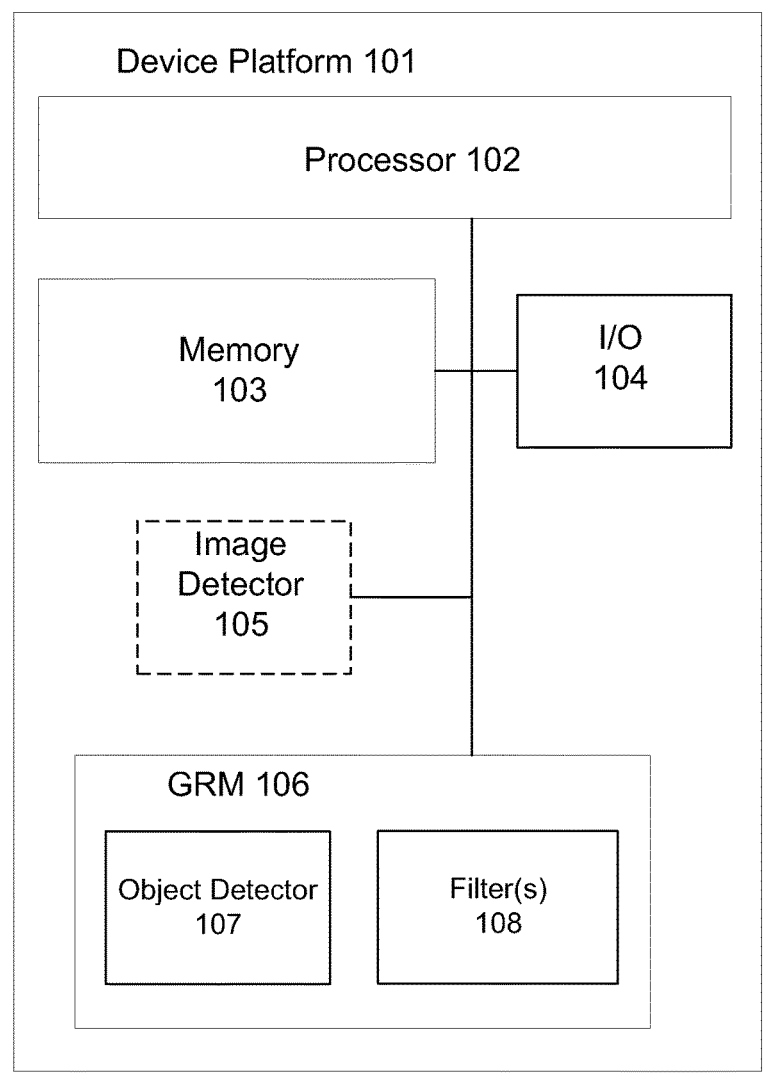
FIG. 1 illustrates one example of a gesture recognition system consistent with the present disclosure.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which one or more hand gestures are recognized. Such discussions are exemplary only, and it should be understood that all or a portion of the technologies described herein may be used in other contexts and with other gestures. Those skilled in the relevant art(s) with access to the teachings provided herein will recognize additional modifications, applications, and embodiments within the scope of this disclosure, and additional fields in which embodiments of the present disclosure would be of utility.

The technologies described herein may be implemented using one or more electronic devices. The terms "device," "devices," "electronic device" and "electronic devices" are interchangeably used herein to refer individually or collectively to any of the large number of electronic devices that may be used as a gesture recognition system consistent with the present disclosure. Non-limiting examples of devices that may be used in accordance with the present disclosure include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, gesture recognition systems herein are preferably implemented in or with one or more cellular phones, desktop computers, electronic readers, laptop computers, set-top boxes, smart phones, tablet personal computers, televisions, or ultra-mobile personal computers.

For ease of illustration and understanding the specification describes and the FIGS. depict gesture recognition systems and methods as implemented in or with a single electronic device. It should be understood that such description and illustration is for the sake of example only and that the various elements and functions described herein may be distributed among and performed by any suitable number of devices. For example, the present disclosure envisions embodiments in which a first device is configured to perform object (gesture) detection operations consistent with the present disclosure, whereas a second device is configured to perform filtering operations consistent with the present disclosure.

Likewise for ease of understanding and description, the present disclosure often uses the term "gesture" in connection with one or more hand gestures, e.g., a specific hand pose (e.g., open palm, closed palm, one/two/three finger(s) raised, "horns" sign, "peace" sign, etc.). While the gesture detection technologies of the present disclosure are particularly useful for detecting hand gestures, it should be understood that they may be applied to detect other types of gestures as well. Indeed the present disclosure envisions the use of the technologies described herein to detect gestures made with the face (e.g., mouth, eye), arms, torso, legs, feet, etc. of a user, as well as combinations thereof. Likewise the technologies described herein may also be extended to applications in which detection of non-human animal gestures is desired.

As used in any embodiment herein, the term "module" may refer to software, firmware, and circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously. In some embodiments one or more modules described herein may be in the form of logic that is implemented at least in part in hardware to perform one or more object detection and/or filtering operations described herein.

As used herein the term "object" refers to one or more gestures, such as one or more poses of the hand, face, foot, arm or other body part. Therefore in contextually appropriate instances it may be understood that the term "object" is used interchangeably herein with the term "gesture". Thus, an "object detector" may be understood as a "gesture detector," and vice versa. With this in mind, the term "hit" is often used herein to denote the detection of an object (gesture) within a region of an input image under, e.g., as detected by an object detection framework. The term "true hit" means a hit that is generated by an object detector in response to the direction of an object that is in fact present in the input image. In contrast, the term "false positive" means a hit that is inaccurately generated by an object detector, i.e., which was generated by an object detector but does not correlate to a gesture in the input image.

The present disclosure generally relates to technologies for providing two-dimensional gesture recognition. As will be explained in detail below the technologies described herein may generally employ a series of relatively weak object detectors, classifiers and/or filters to detect gestures from a two-dimensional image and filter out false positives. Any suitable object detector may be used where in one embodiment one that employs a scan stage, feature extraction stage, and a classification stage may be used. Non-limiting examples of such detectors include AdaBoost based detectors, such as but not limited to Viola-Jones detectors.

In any case, the object detector may be employed to detect potential gestures of interest within a two-dimensional image. The output (results) produced by the object detector (which may contain true hits and false positives) may then be further analyzed by one or more filters. In general, the filter(s) may function to identify and remove at least a portion of the false positives (if any) from the output of the object detector. Application of the filter(s) may therefore improve the accuracy of the output of the object detector. The output of the system (e.g., after processing by the object detector and the filter(s)) may also associate one or more hits with the location in the two-dimensional image under consideration at which the hit is detected. As will become clear, in some embodiments the systems and methods described herein can detect gestures with high accuracy, and may be suitable for use in low power, low complexity, challenging operating conditions (e.g. lighting changes) and/or low cost gesture recognition applications.

One aspect of the present disclosure therefore relates to a gesture recognition system. In this regard reference is made to FIG. 1, which depicts an example gesture recognition system consistent with the present disclosure. As shown, gesture recognition system 100 includes device platform 101, processor 102, memory 103, communications resources (COMMS) 104, optional image detector 105, and gesture recognition module (GRM) 106. In some embodiments gesture recognition system 100 is implemented in and/or is in the form of one or more electronic devices, as defined above. Without limitation, in some embodiments gesture recognition system 100 is in the form of a cellular phone, a smart phone, a television, a laptop computer, a desktop computer, a tablet computer, a mobile internet device, combinations thereof, and the like.

Device platform 101 may be any suitable device platform, and in some embodiments correlates to the type of electronic device that is used as gesture recognition system 100. Thus for example where gesture recognition system 100 is implemented in a cellular phone, smart phone, desktop computer, laptop computer, etc., device platform 101 may be a cellular phone platform, smart phone platform, desktop computer platform, laptop computer platform, etc. respectively.

Regardless of its nature, device platform 101 may include processor 102, memory 103, and communications resources (COMMS) 104. Processor 102 may be any suitable general purpose processor or application specific integrated circuit, and may be capable of executing one or multiple threads on one or multiple processor cores. Without limitation, in some embodiments processor 102 is a general purpose processor, such as but not limited to the general purpose processors commercially available from INTEL® Corp., ADVANCED MICRO DEVICES®, ARM®, NVIDIA®, APPLE®, and SAMSUNG®. In other embodiments, processor 102 may be in the form of a very long instruction word (VLIW) and/or a single instruction multiple data (SIMD) processor (e.g., one or more image video processors, etc.). It should be understood that while FIG. 1 illustrates device platform 101 as including a single processor 102, multiple processors may be used.

Memory 103 may be any suitable type of computer readable memory. Exemplary memory types that may be used as memory 103 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 103 may include other and/or later-developed types of computer-readable memory.

COMMS 104 may include hardware (i.e., circuitry), software, or a combination of hardware and software that is configured to allow gesture recognition system 100 to receive and/or transmit data or other communications. For example, COMMs 104 may be configured to enable gesture recognition system 100 to receive one or more input images and/or a video stream, e.g., over a wired or wireless communications link (not shown) between gesture recognition system 100 and another device, e.g., another computer system (e.g., a third party computer and/or server), a video and/or still camera, combinations thereof, and the like. COMMS 104 may therefore include hardware to support wired and/or wireless communication, e.g., one or more transponders, antennas, BLUETOOTH™ chips, personal area network chips, near field communication chips, wired and/or wireless network interface circuitry, combinations thereof, and the like.

As further shown in FIG. 1, device platform 101 may optionally include image detector 105. When included, image detector 105 may be or include any suitable image and/or video sensor, such as but not limited to a still camera, a video camera, a depth camera, an infrared camera, combinations thereof, and the like. As may be appreciated, image detector 105 may enable gesture recognition system 100 to obtain test images and/or video independent of a third party system. It should be understood that while FIG. 1 depicts optional image detector 105 as being integral with device platform 101, such a configuration is not required. Indeed in some embodiments optional image detector 105 may be separate from device platform 101, but may be configured to communicate with device platform 101 (or, more particularly, with I/O 104) via a wired and/or wireless communications link. Thus for example, image detector 105 may be in the form of a discrete network enabled video and/or still camera.

As will be described in further detail below, gesture recognition system 100 may be configured to receive one or more input images and/or an input video stream for analysis in conjunction with one or more gesture recognition operations. By way of example, gesture recognition system 100 may be configured to receive one or more input images and/or an input video stream from optional image detector 105. Alternatively (e.g., where gesture recognition system 100 does not include image detector 105), gesture recognition system 100 may receive one or more input images and/or an input video stream via I/O 104, e.g., from an external image detector, a third party server, and/or other remote computing system. In instances where gesture recognition system 100 receives an input video stream, it may process the input video stream into one or more input images, e.g., using video parsing technologies that are well understood in the art. In either case, the input images may in some embodiments be two-dimensional images.

Gesture recognition module (GRM) 106 may include hardware, software, or a combination of hardware and software that is configured to perform one or more object detection operations, filtering operations, and optional pre-processing operations consistent with the present disclosure, and/or to cause gesture recognition system 100 to perform one or more of such operations. More specifically, in some embodiments GRM 106 may be in the form of logic implemented at least in part on hardware to perform various object detection, filtering operations and optional pre-processing consistent with the present disclosure. Alternatively or additionally GRM 106 may be in the form of or include computer readable instructions that are stored on device platform 101 (e.g., in memory 103), which when executed by processor 102 cause gesture recognition system 100 to perform object detection, filtering operations and/or optional pre-processing operations consistent with the present disclosure.

As explained previously gesture recognition system 100 may receive one or more (two-dimensional) input images in any suitable manner. Regardless of how they are received, one or more input images may be provided to GRM 106 for the performance of one or more (optional) pre-processing operations, object detection operations and filtering operations. As will become clear, one desired outcome of such operations is the production of an output in which true hits corresponding to gestures (if any) detected in the input image are reported with relatively few or no false positives.

GRM 106 may be configured to perform object (gesture) detection operations on an input image. In this regard GRM 106 may include one or more object detectors, such as object detector 107 in FIG. 1. As will be described in detail below, object detector 107 is generally configured to analyze an input image to detect regions of the input image that may contain a gesture of interest. Object detector 107 may also produce a first set of hits (if any) detected in the analyzed input image, i.e., wherein each hit corresponds to a region of the input image that may contain a gesture of interest. The first set of hits may include the location of the hit and optionally the type of gesture detected at that location.

For example, object detector 107 may analyze an input image for visual cues that may be indicative of a gesture of interest. Non-limiting examples of such visual cues include but are not limited to structure, texture, and/or color associated with one or more gestures. In some embodiments object detector 107 may give more or less weight to one or more of the above noted factors, e.g., in an effort to compensate for various factors affecting the quality and/or suitability of the input image for analysis, such as camera movement, noise, variable lighting, background interference etc. For example in some embodiments the structure of a gesture of interest (as opposed to color and/or texture) is weighted more heavily in the analysis of an input image by object detector 107.

As noted previously, any object detector that employs a scan stage, feature extraction stage, and a classification stage may be used as object detector 107. In some embodiments, the object detector 107 is in the form of an AdaBoost classifier such as the Viola-Jones object detection framework (hereinafter, a "Viola-Jones detector"), which can detect objects in real time. In general, a Viola-Jones detector can employ a variety of concepts (e.g., integral images, cascade structures, feature extraction, sliding window mechanisms across multiple scales, combinations thereof, and the like) to achieve relatively good object detection rates against a variety of backgrounds. In some embodiments, a Viola-Jones detector is utilized that analyzes input images for features that resemble Haar basis functions (hereinafter, "Haar-based features" or simply, "Haar features"). However it should be understood that object detectors that analyze for other types of features (e.g., histogram oriented gradient (HOG) features, scale invariant feature transforms (SIFT), speeded up robust features (SURF), oriented first rotated brief (ORB) features, local binary patterns (LBP), combinations thereof, and the like) may also be used, e.g., in combination with various machine learning algorithms.

In some embodiments object detector 107 is in the form of a Viola-Jones detector that performs object detection at least in part by analyzing an input image for using a combination of integral images and a cascade structure trained to detect one or more gestures of interest. In particular object detector 107 may be configured to perform object detection at least in part by analyzing an input image for vertical, horizontal or 45-degree rotated Haar features, although other configurations are also of interest. It is noted that in some embodiments the Haar features are a subset of the complete Haar wavelet functions defined in the literature, and that various combinations of such functions can be derived from the Haar wavelet definitions. It is also noted that when compared to HOG, SIFT, SURF, etc. features, Haar features are relatively primitive and for example may not handle excessive input image rotation and deformation. With this in mind, the effectiveness of image detector 107 in terms of handling rotation may depend on the training set used and the amount of rotated or deformed examples presented during training.

In many instances individual Haar detectors can be trained to support small angular rotations if they are to maintain a low false positive detection rate. While other features (e.g., HOG, SIFT, etc.) may provide more robust support for image rotation, they may do so at the cost of performance and/or power consumption. With this in mind, it has been determined that analyzing input images for vertical, horizontal or 45-degree tilted Haar features can provide a significant performance boost (relative to the other features noted above) while still providing reasonably accurate gesture detection, and particularly when the Haar features are calculated using integral images. As such, object detector 107 may reliably detect gestures within an input image with relatively good performance. Moreover, object detector 107 may work efficiently to detect a variety of objects, such as but not limited to facial gestures, hand gestures, combinations thereof, and the like.

Various factors can impact the performance of object detector 107, i.e., the ability of object detector 107 to detect objects (gestures) within an input image and/or input video stream with a relatively low false positive rate. In particular, characteristics of the input image and/or input video stream may have an impact on the performance of object detector 107.

For example, an input image may include a significant amount of noise, e.g., due to low light, low quality image sensors, etc. Similarly all or a portion of an input image/video stream may not be well illuminated and/or may be out of focus. Moreover an input image and/or objects therein may be rotated in some fashion. Any one or a combination of these factors may negatively impact the performance of object detector 107, as may be reflected by a reduction in object detection rate and/or an increase in false positives.

To address one or more of these issues, in some embodiments GRM 106 (or another component of gesture recognition system 100) may be configured to process an input image and/or input video stream before it is subject to analysis by object detector 107. For the sake of brevity, such operations are referred to herein as "pre-processing operations." Non-limiting examples of pre-processing operations that may be carried out by GRM 106 include de-noising, illumination enhancement, sharpening, image rotation, combinations thereof, and the like. Of course these pre-processing operations are enumerated for the sake of example only, and other pre-processing operations may be performed by GRM 106 or another component of gesture recognition system 100.

De-noising operations generally attempt to remove or otherwise address noise contained in an input image and/or input video stream. Any suitable de-noising technique may be used, such but not limited to Gaussian filtering, speckle reduction, total variation filtering, linear and non-linear filtering, anisotropic diffusion, combinations thereof, and the like.

Illumination enhancement operations generally attempt to improve the illumination of all or a portion of an input image. Any suitable illumination enhancement technique may be used, such as but not limited to by adaptive contrast stretching, image histogram equalization, other illumination enhancement techniques, combinations thereof, and the like.

Sharpening operations generally attempt to enhance the definition of line structures and/or other details in an input image, e.g., so as to improve object detection from an input image that may be out of focus. In this regard any suitable sharpening technique may be sued, such as but not limited to high pass filtering, wavelet-domain filtering, subtraction, image de-blurring (e.g., with an inverse filter), combinations thereof, and the like.

Image rotation operations may be performed on an input image, and may improve the ability of object detector 107 to detect objects (gestures) in instances where the input image (or objects contained therein) is rotated. For example, image rotation operations may be performed to make the object detection operations of object detector 107 rotation invariant. As used herein, the term "rotation invariant" means that the object detector is capable of detecting a rotated gesture, even if it has only been trained and/or designed to detect gestures in one rotation or a relatively small angular of rotations.

In some embodiments, rotation operations may be performed by rotating an input image to produce a set of rotated images, after which each rotated image in the set may be provided to object detector 107 for processing. More specifically, an input image may be rotated between a specified region of +/−N degrees, using a delta of Q degrees, to produce a set containing a total (Z) of rotated input images, where N and Q may be the same or different and may be any suitable value (e.g., 1, 5, 10, 15, 21, 28, 35 degrees), and $Z=2 \cdot (N/Q)+1$.

Thus for example where an input image is rotated about a region (N) of 21 degrees using a delta (Q) of 3 degrees, the result of the rotation operation would be the production of set containing 15 (Z=2(21/3)+1) rotated images. Object detector 107 (e.g., a Viola-Jones object detector or another object detector) may then perform object detection on each of the rotated images, and to produce a set of hits from each of the rotated images. Concurrently or subsequently object detector 107 may consolidate the hits identified from the analysis of all of the rotated images to produce a consolidated set of hits. In some embodiments the consolidated set of hits may include all of the hits from the analysis of each of the rotated images. Alternatively, in some embodiments the consolidated set of hits may include hits that were detected in at least a threshold number of the rotated images. In such instances hits that were detected in less than the threshold number of rotated images may be discarded and/or excluded from the consolidated set of hits.

Figure 4:
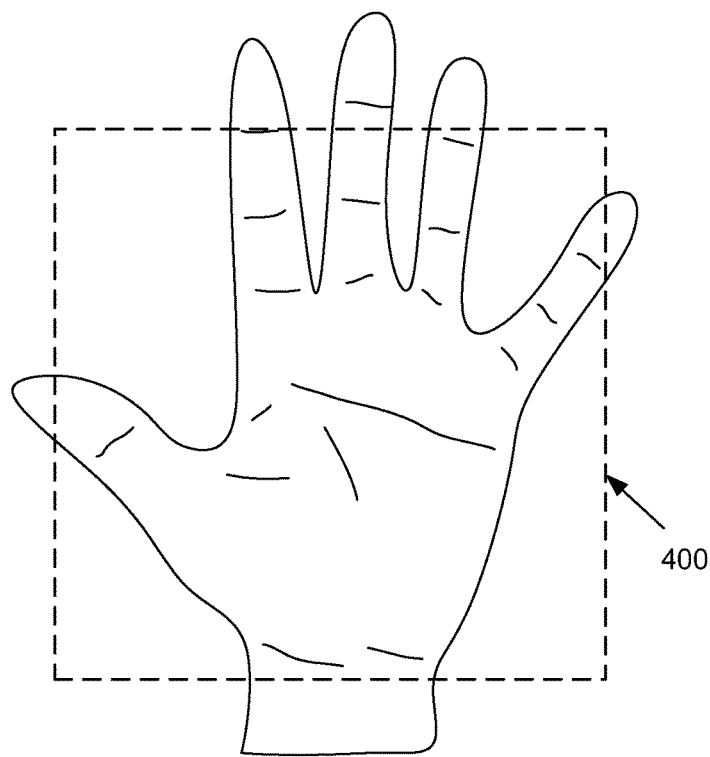
FIG. 4 depicts one example of a two-dimensional image of an open palm gesture.

Apart from the above considerations, the background of an input image may affect the performance of object detector 107 to detect certain gestures in an input image, such as a gesture that exposes the background. As one example of such a gesture that exposes the background reference is made to FIG. 4, which depicts one example of an open palm gesture. As shown in this example of the open palm gesture, the palm of the hand is oriented towards an image detector and the fingers are spread apart. As a result, the background between the fingers is exposed to the image detector. As the background may change from image to image, exposure of the background to the image detector can introduce a significant number of variations that may negatively impact detection rate, and/or which may increase the number of false positives produced by object detector 107.

The effect of the background (hereinafter, "background interference") on object detection may not be present or may be present to a lesser degree with regard to gestures that do not expose (or expose relatively little of) the background to an image sensor. As one example of such a gesture reference is made to FIG. 5A, which depicts one example of a closed palm gesture. As shown in this example of the closed palm gesture, the fingers are curled towards the palm with the thumb adjacent the index finger such that the background of the image is not significantly exposed to the image sensor. In this context, the degree to which the background is exposed refers to the relative number of "background" pixels and "gesture" pixels that would be present if pixels defining a gesture were bounded by a box, e.g., during an image processing operation. For example the open palm pose of FIG. 4 would be considered to significantly expose the background, as a box 400 encompassing the pose would include a significant number of background pixels (e.g., those between the fingers). Indeed in that instance, the number of background pixels may be on the same order of magnitude as the number of pixels of the hand. In contrast the closed palm gesture of FIG. 5A may be considered one that does not significantly expose the background, as a box (e.g. box 500) bounding the gesture would include relatively few background pixels.

In some embodiments GRM 106 may be configured to only detect gestures for which background interference is limited, such as but not limited to the closed palm gesture. Alternatively or additionally and as will be discussed later, GRM 106 may be configured to address the background interference issue, e.g., by using landmark detection to detect portions of a gesture that do not expose the background, after which further analysis may be performed to determine the specific gesture. Further details regarding this approach will be provided later.

In some embodiments object detector 107 may be configured so as to provide a desired level of performance, such as a desired hit rate (i.e., number of objects/gestures detected) in combination with an acceptable number/rate of false positive detections. With this in mind, the number of hits and/or false negatives reported by object detector 107 may be controlled in various ways, such as by adjusting its sensitivity. For example in instances where object detector 107 is a Viola-Jones object detector, its sensitivity may be adjusted by adjusting the number of cascade levels that are processed by the detector. As the number of processed cascade levels is decreased, the number of objects detected may increase but the accuracy of those detections may decrease (i.e., the false positive rate may increase). In contrast as the number of processed cascade levels increases, the number of objects detected may decrease but the accuracy of those detections may increase (i.e., the false positive rate may decrease).

The performance of object detector 107 may also be affected by the manner and extent to which it is trained. For example, the detection accuracy of object detector 107 may be improved with regard to a certain type of pose or group of poses by training object detector 107 with that pose or group of poses. Alternatively or in addition to the Viola-Jones detector other machine learning based object detectors may be employed to improve the detection rate of object detect 107 across a large number of pose variations, which may be more efficient (computationally and from a memory standpoint) than training object detector 107 with each variation of a gesture, though of course such training may also be used.

The above discussion focuses on the use of a Viola-Jones object detector that is configured to use Haar (or other) features within an input image that correlate to one or more gestures of interest. As such, the Viola-Jones detector may be configured to look for features correlating either to an entire gesture or to a portion thereof. Although such analysis can be useful in many instances, the ability to detect gestures that expose a significant portion of the background with a reasonable false positive rate may be limited. Indeed as noted above, background interference that is present in certain gestures (e.g., an open palm gesture, one finger raised, two finger raised, etc.) may introduce significant variations that can hinder gesture detection rate and/or produce an undesirable number of false positives.

With the foregoing in mind, in some embodiments object detector 107 may be configured to implement a landmark detection paradigm, which may facilitate the detection of gestures from input images in the presence of background interference. Alternatively or additionally, use of a landmark detection paradigm may also allow for the use of an object detector that is trained to detect one type of gesture (i.e., a first gesture) to detect another type of gesture (i.e., a second gesture). In any case, object detector 107 may be configured to analyze input images for landmarks (features) that are present in portions of a gesture that do not significantly expose the background.

For example, in a first use case an object detector may be trained to detect a landmark portion of a gesture (e.g., an open palm gesture), which may be any suitable portion of the gesture. In instances where the gesture is an open palm gesture the landmark portion may, for example, be the interior palm of the hand. Once this landmark portion is detected, additional heuristics may be employed and classify the full gesture. As may be appreciated, in the first use case the gesture recognition pipeline may handle background variations more efficiently.

In a second use case, a landmark detection paradigm may be employed to extend the functionality of a gesture recognition pipeline. In this context, an object detector may be trained to detect one specific gesture, which for the sake of clarity is referred to herein as a "first gesture" or a "gesture of interest." With this in mind, landmark features of the first gesture may be similar to landmark features of another gesture, which for the sake of clarity is referred to herein as a "second gesture" or a "landmark gesture." In this context, the term "landmark feature" refers to a region which is common between the gesture of interest (first gesture) and landmark gesture (second gesture). The degree of commonality may be defined in some embodiments by a series of interest points, as discussed below.

Figure 5A:
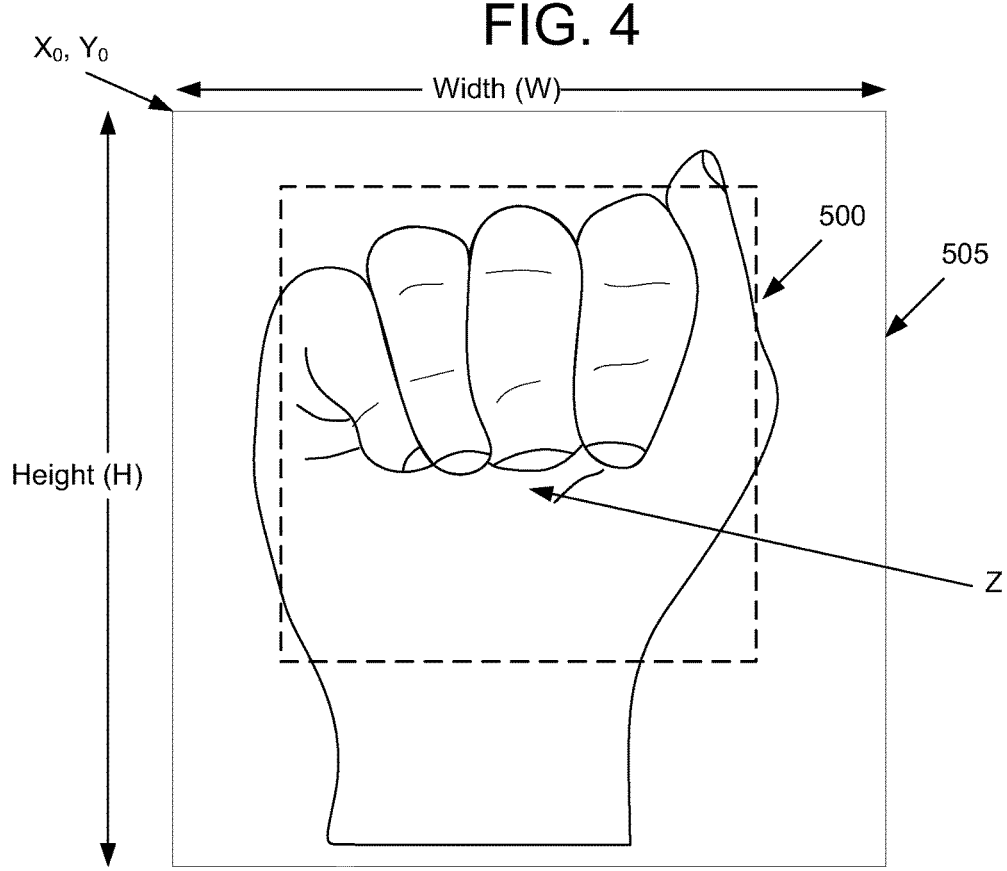
FIGS. 5A-5D stepwise illustrate operations of a closed palm recognition filter on a two-dimensional image of a closed palm, consistent with the present disclosure.
Figure 5B:
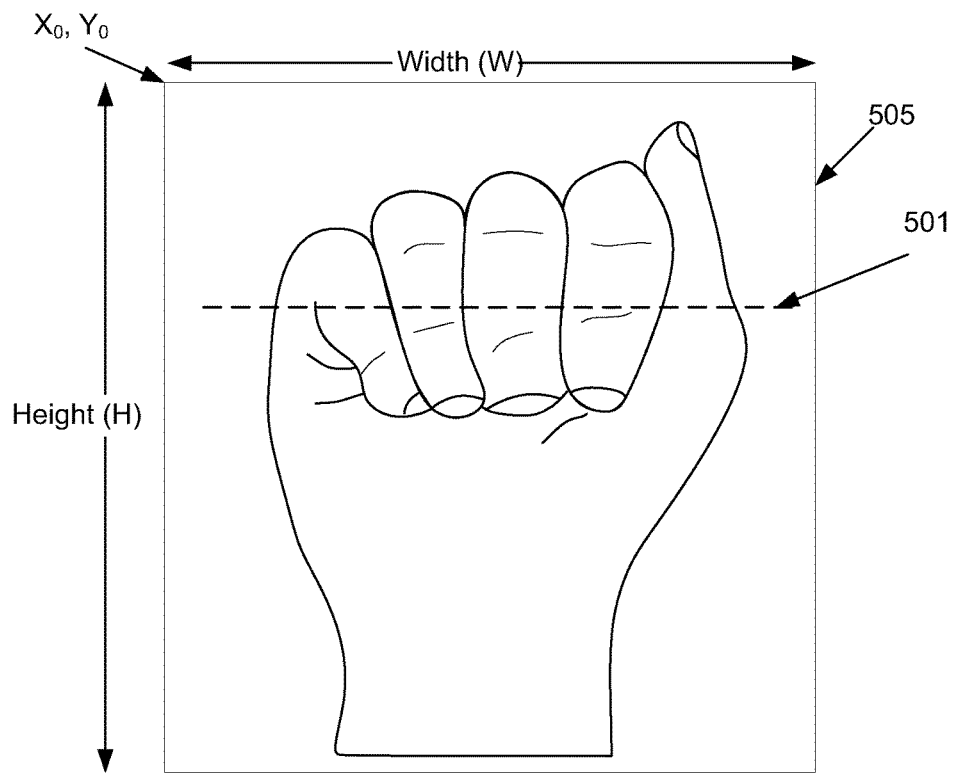
Figure 5C:
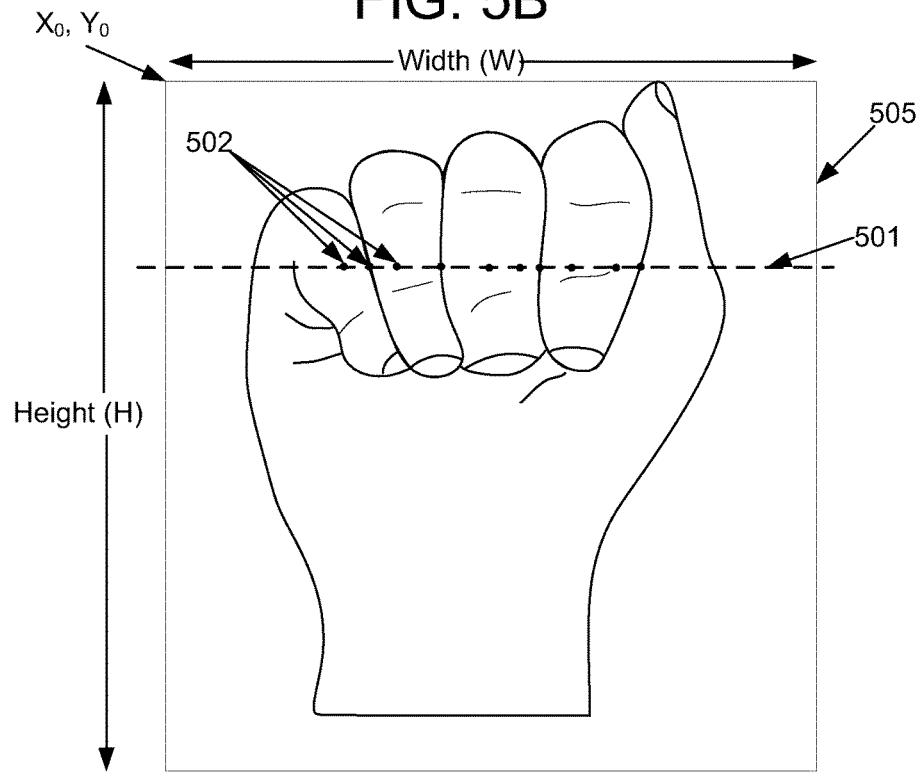
Figure 5D:
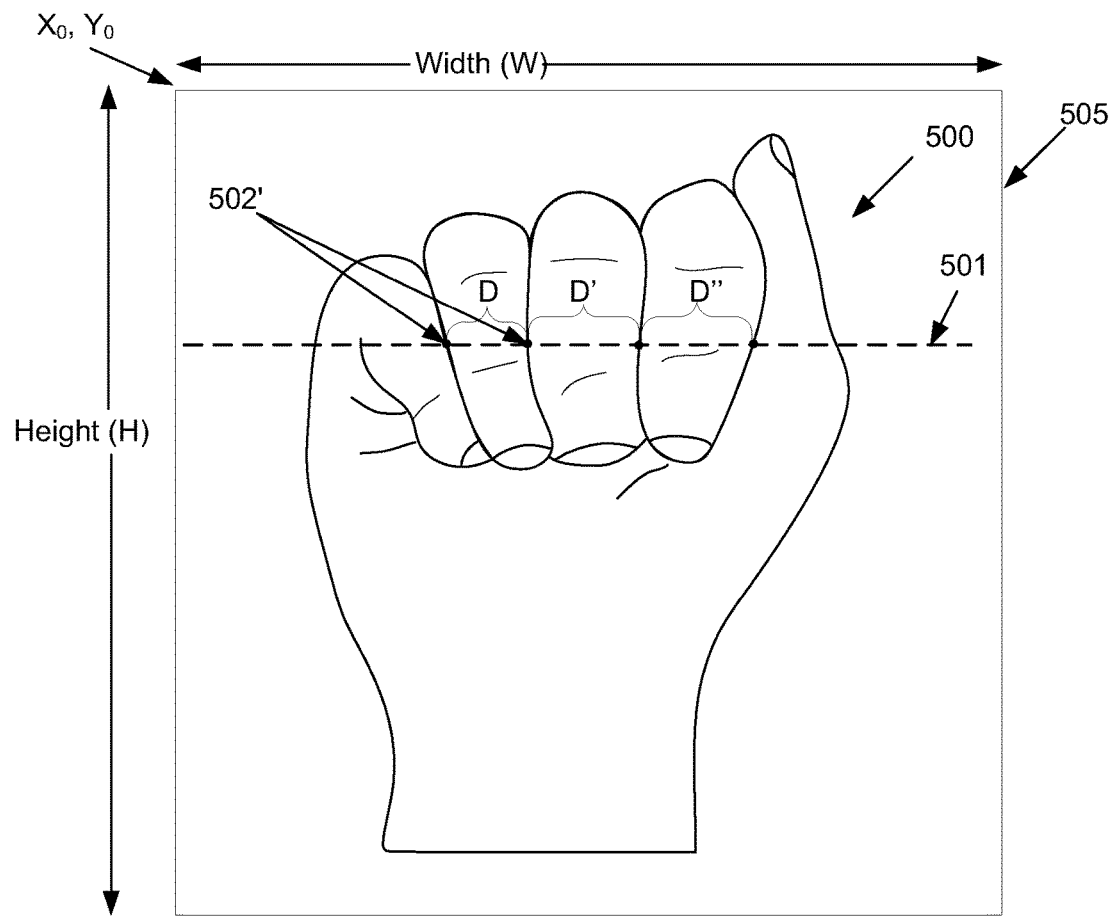
Figure 6:
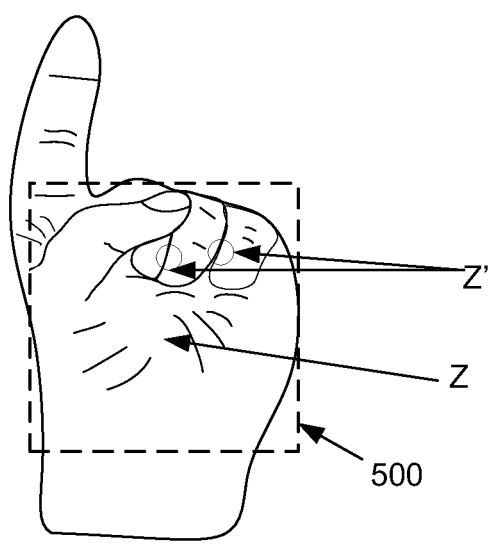
FIG. 6 depicts example operations of a landmark detection filter consistent with the present disclosure on a two-dimensional image of a 1-finger raised gesture.

Consider for example a scenario in which the closed palm gesture shown in FIG. 5 is the first gesture/gesture of interest, and the one-finger raised gesture of FIG. 6 is the second/landmark gesture. In such an embodiment an object detector may be trained to detect landmark features of the closed pose, such as but not limited to portions of the upper palm (denoted as region Z in FIG. 5A). With this in mind, many of the same landmark features (or interest points thereof) in the closed palm pose of FIG. 5A may also be found in the one finger raised pose shown in FIG. 6. This is generally illustrated by regions Z and Z' in FIG. 6, which may be common to similar landmarks in FIG. 5A, albeit in a reversed orientation. As such, the landmark detection scheme used to detect the closed palm pose of FIG. 5A may be extended to detect the one-finger raised posed of FIG. 6, depending on the extent to which the two poses share common landmark features and/or points of interest.

More generally, in the above examples interest points in a landmark portion of a gesture or between a gesture of interest (e.g., FIG. 5A) and a landmark gesture (e.g., FIG. 6) may include portions of the upper palm (denoted by region Z in FIGS. 5A and 6), the knuckles and/or portions of the fingers (denoted by region Z' in FIG. 6), centroids of the analyzed regions, combinations thereof, and the like. Of course Z and Z' are illustrated for the sake of example only, and other portions of a gesture of interest may be used. Likewise it should be understood that the landmark detection paradigm is not limited to hand gestures, and may be applied to detect any suitable gesture. In addition, the landmark detection paradigm is not limited to single classes of gestures, and may be applied across multiple classes.

In both of the above noted example use cases, when one or more landmarks are detected object detector 107 may perform additional image processing operations in an attempt to identify a gesture. In this regard object detector 107 may use one or more detected landmarks as a starting point for image processing operations that search regions around the landmark(s), and which correlate one or more of the searched regions to candidate poses corresponding to a gesture. The geometry and scale of the searched regions may vary widely, and in some embodiments may be rectangular, elliptical, circular, square, etc. in shape.

In some embodiments object detector 107 may search one or more regions around a detected landmark using a combination of image segmentation and template (shape) matching techniques. For example, each region around a detected landmark may be analyzed (e.g., using a color model (e.g., a skin model), histogram thresholding, etc.) to segment each region into portions corresponding to a suspected gesture and portions corresponding to the background. Alternatively or additionally, other conventional segmentation techniques such as graph-based segmentation may be used. Once segmentation is complete, template (shape) matching operations may be performed on the segmented portions corresponding to the suspected gesture. The shape matching operations may be performed, for example, by matching one or more of the contours, region, or shape characteristics of the segmented portions corresponding to the suspected gesture against a library of candidate gestures. Feature extraction may also be applied for extracting shape or region characteristics from the segmented portions corresponding to the suspected gesture, as well as for classifying the extracted shape and associating the extracted features with one or more candidate gestures. Depending on the outcome of this analysis, object detector 107 may or may not produce a hit signifying the detection of a candidate pose.

Alternatively or in addition to the image segmentation and template matching techniques noted above, object detector 107 may use shape analysis to determine the presence or absence of a gesture of interest in one or more regions of an input image. For example, in some embodiments object detector may use one or more landmark points (e.g., a center of a portion of the input image under consideration) to drive an optimized shape matching process. Such processes may include matching a statistical model of a shape using an active appearance model and/or matching objects coming from the shape using the Chamfer transform.

As may be appreciated from the foregoing, the landmark detection paradigm may leverage the capability of a Viola-Jones detector or other object detector to efficiently discover one or more landmarks in an input image under consideration. This may improve the performance of image segmentation, shape matching, etc., as there may be a relatively high degree of confidence in the landmark (starting) points, reducing the likelihood that such processes may be performed on less relevant portions of the input image.

In any case, as described above object detector 107 may perform object detection operations on all or a portion of an input image and produce an output (e.g., a signal, a data structure, etc.) containing hits pertaining to gestures that were detected in the input image. For example, the output of object detector 107 may correlate each hit with a location information (e.g., pixel coordinates or some other indicia) specifying a region of the input image where a gesture is detected. In some embodiments, the output may also include location information specifying region(s) of an input image in which a gesture was not detected. The type of gesture detected may also be included in the output of object detector 107. For the sake of convenience, the hits contained in the output produced by object detector 107 are occasionally referred to herein as a "first set of hits." It is noted that "first set of hits" in this context is different from the "first set" discussed below in conjunction with one example of a custom closed palm filter.

As noted above, various factors such as the sensitivity of object detector 107, the quality of the input image, etc., may cause object detector to produce a number of false positives, i.e., to identify hits at one or more locations of an input image that do not contain a gesture even though a gesture is not actually present at that location. These false positives may be included in the output of the object detector, potentially lowering the accuracy and/or usefulness of the output with regard to gesture detection. Put in other terms, object detector 107 alone may produce an output that contains a significant number of false positive hits. As a result, the use of object detector 107 alone may not detect gestures in an input image with a sufficient degree of accuracy.

To address this issue the technologies of the present disclosure may employ one or more filters that are configured to remove at least a portion of the false positive hits in the first set of hits identified by object detector 107, potentially improving the accuracy of the remaining hits. This concept is illustrated in FIG. 1, in which GRM 106 is illustrated as including one or more filters 108. As will be discussed below, application of one or more of the filter(s) described herein can in some embodiments remove all or nearly all of the false positive hits from the output of object detector 107, resulting in the production of a relatively accurate output that contains few or no false positive hits. Indeed, in some embodiments filter(s) consistent with the present disclosure can remove greater than or equal to about 90%, such as greater than or equal to 95%, 99%, about 100%, or even 100% of the false positive hits (if any) in the first set of hits identified by the object detector.

Non-limiting examples of filter(s) 108 that may be applied to the output of object detector 107 include temporal filters, skin filters, structure filters, combinations thereof, and the like. Of course such filters are identified for the sake of example only, and other filters and/or combinations of filters may be used.

In some embodiments GRM 106 may apply a temporal filter to the first set of hits provided by object detector 107 (e.g., to the output of object detector 107). In general, the temporal filter may be configured to prune false positive results from the first set of hits by analyzing the (first) sets of hits produced by object detector 107 over a series of input images (e.g., frames) or, more generally, over a period of time. In this regard a series (e.g., 2, 5, 10, 15, 20, etc.) of input images may be provided to object detector 107. In response, object detector 107 may perform object detection operations on each of those input images and produce corresponding (first) sets of hits (i.e., a corresponding output) identifying the location of gestures detected in each of those images, and optionally the type of gesture detected. GRM 106 may then apply a temporal filter to the output produced from each input image. In some embodiments, the temporal filter may determine whether a hit reported in one location of a first input image is also reported in the same location for one or more other input images in the same series. If a hit under consideration is reported in the same or about the same (e.g., +/−5% difference in pixel coordinates) location in greater than or equal to a threshold number of input images (e.g., 5, 10, 15, 20, etc.), the hit may be considered true and retained. In contrast if the hit is reported in less than the threshold number of input images, it may be considered a false positive and discarded.

Alternatively or additionally, GRM 106 may apply one or more skin filters in an effort to remove false positive hits from the output of object detector 107. For example, the skin detector may be configured to analyze regions of an input image reported by object detector 106 to contain a gesture against one or more pre-trained skin-models. Non-limiting examples of such models include skin reflectance models, skin color models, skin radiance models, skin texture models, combinations thereof, and the like. Such models may be developed and/or trained in any suitable manner, such as with a Gaussian Mixture Model, color spaces (e.g., to make the filter illumination invariant), one or more specific persons, etc. In such embodiments the skin filters may be configured to analyze hits identified by object detector 107 and to discard hits that fail to satisfy the requirements and/or characteristics of the applied model(s). Without limitation, in some embodiments the skin filter is or includes a skin texture model.

In any case, as noted above GRM 106 may apply the skin filter to analyze the regions of an input image correlating to a hit reported in the output of object detector 107, and to validate whether a threshold number of pixels in a region under consideration match one or more skin models. Where the number of pixels matching one or more skin models of the skin filter in a region under consideration meets or exceeds a threshold number, the hit associated with the region may be considered true and retained. Conversely where the number of pixels matching one or more skin models of the skin filter in a region under consideration does not exceed the threshold number, the hit associated with the region may be considered a false positive and discarded.

Alternatively or additionally, GRM 106 may apply one or more custom gesture filters in an effort to remove false positive hits from the output of object detector 107. Non-limiting examples of suitable custom gesture filters include those that are based on heuristics and/or classifiers which may examine the visual structure of the region(s) of an input image which are reported by object detector 107 to include a hit (gesture), and to determine whether such region(s) meet requirements specified by the filter. In some embodiments the requirements of the filter may be tailored towards the detection of certain gestures, and in particular hand gestures such as the closed palm gesture. In this regard reference is made to the discussion of the custom closed palm filter described below. Of course, custom filters may be developed and applied for other gestures as well, and it should therefore be understood that the specific mention of a custom filter for the closed palm gesture is not limiting.

While the foregoing discussion focuses on the application of one of the above noted filters, it should be understood that such discussion is for the sake of example only and that a combination of filters may be applied to prune false positives from the output of object detector 107 (i.e., from a first set of hits produced by object detector 107). For example, in some embodiments a combination of a temporal filter and one of a skin filter and a custom filter are applied to prune false positives from the output of object detector 107. In other embodiments, a combination of skin filter and a custom filter is applied. And in still further embodiments, a combination of temporal, skin, and custom filters is applied to prune false positives from the output of object detector 107.

As may be appreciated from the foregoing, filters 108 may be applied by GRM 106 to remove all or a least a portion of the false positive results that may be present in the output produced by object detector 107. Subsequent to application of filters 108, GRM 106 may be configured to discard the hits identified as false positives, and to consolidate the hits that were determined to be true. GRM 106 may then produce an output containing the true hits, e.g., where each true hit is correlated with a corresponding region of an input image (e.g., pixel coordinates) and optionally with the type of gesture detected. For the sake of convenience, the output of GRM 106 after the application of the filter(s) may be referred to herein as a "second set of hits." It is noted that "second set of hits" in this context is different from the "second set" discussed below in conjunction with one example of a custom closed palm filter.

Another aspect of the present disclosure relates to methods of performing gesture detection. In this regard reference is made to FIG. 2, which is a flow chart depicting example operations of a gesture recognition method consistent with the present disclosure. As shown, the method begins at block 200. The method may then proceed to optional block 201, wherein pre-processing operations may be performed on one or more input images. As noted above, such pre-processing operations may include de-noising, illumination enhancement, sharpening, image rotation, combinations thereof, and the like. In instances where an input is provided in the form of a video stream, pre-processing may also include parsing the input video stream into input frames, e.g., using video parsing techniques understood in the art.

After an input image has been pre-processed or if pre-processing is not required the method may proceed to block 202, wherein object (gesture) detection operations may be performed on the input image. Although any suitable object detection methodology may be applied, in some embodiments object detection is performed by analyzing an input image with an object detector, such as a Viola-Jones detector. For example, a Viola-Jones detector may analyze regions of an input image to determine the presence of one or more gestures of interest, e.g., using Haar features and/or a landmark detection paradigm as described above. Pursuant to block 203, a determination may be made as to whether one or more gestures were detected in an image under consideration. If not, the method may proceed to block 210, which will be described later. If one or more gestures was/were detected, however, the detected gesture(s) (hits) may be consolidated into an output (not shown). As noted previously, the output (e.g., of the object detector) may associate each hit with a region of the input image, and optionally with an identification of the type of gesture that was detected.

Figure 2:
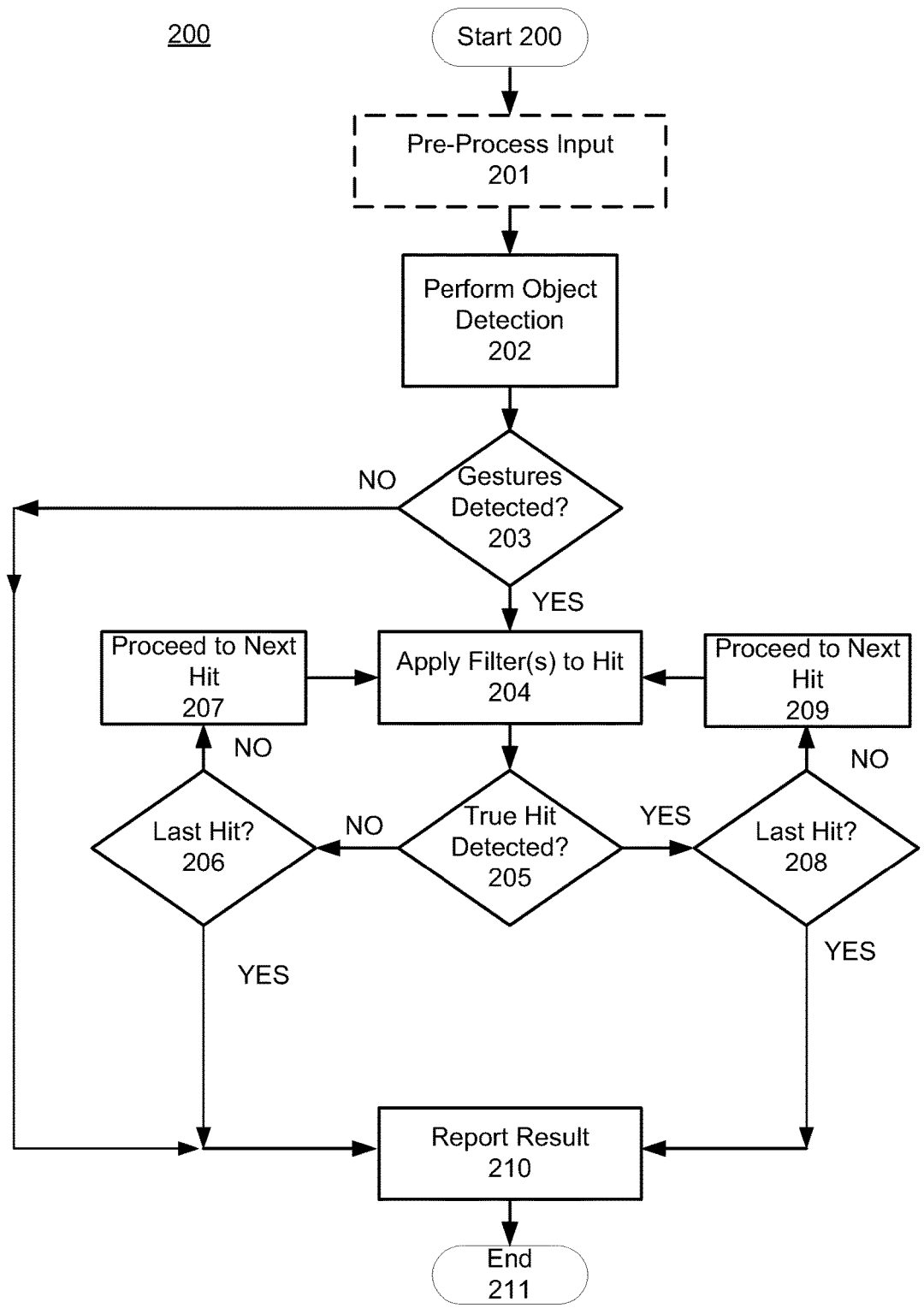
FIG. 2 is a flow chart of example operations consistent with an example gesture recognition method consistent with the present disclosure.

The method may then proceed to block 204, wherein one or more filters may be applied to the output produced by the object detector. For example, one or more of a temporal filter, skin filter, custom gesture filter, etc. may be applied to a hit in the output. Depending on the outcome of the filter(s), a hit may be considered a true hit or a false positive as discussed above. This concept is illustrated in FIG. 2, where it is indicated that after the application of the filter(s) to a hit pursuant to block 204 the method may proceed to block 205, wherein a determination may be made as to whether a true hit was detected. If not, the hit may be considered a false positive and discarded, after which the method may proceed to block 206. Pursuant to block 206 a determination may be made as to whether the hit analyzed pursuant to blocks 204 and 205 was the last hit in the output of the object detector. If so the method may proceed to block 210. If not, the method may proceed to block 207, wherein the next hit in the output of the object detector is selected. The method may then loop back to block 204, wherein the filter(s) may be applied to the selected hit.

Returning to block 205, if a true hit is detected it may be retained and the method may proceed to block 208. Pursuant to block 208, a determination may be made as to whether the hit analyzed pursuant to blocks 204 and 208 was the last hit in the output of the object detector. If so the method may proceed to block 210. But if not the method may proceed to block 209, wherein the next hit in the output of the object detector is selected. The method may then proceed to block 204.

Pursuant to block 210, a result (output) of the filtering operations performed pursuant to blocks 204-208 may be generated. Consistent with the foregoing discussion, the output produced pursuant to block 210 may include a consolidation of the true hits, e.g., with the false positive hits removed. In some embodiments each of the true hits may be correlated with location information (e.g., pixel coordinates) identifying a region of the input image in which the gesture corresponding to the hit was detected. Each hit may also optionally include information identifying the type of gesture that was detected. Alternatively or additionally, a hit may also include information about the size of the portion of the image where the gesture was detected.

As discussed above one or more custom filters may be applied to prune false positive hits from the output of an object detector such as a Viola-Jones detector. In this regard, one aspect of the present disclosure relates to systems and methods which employ a custom filter for a closed palm pose (hereinafter, "gesture detection filter"). As will become clear from the following discussion, the gesture detection filters described herein capitalizes on the fact that some gestures (such as the closed palm, one finger raised, two finger raised, etc.) include points and/or boundary areas between features of the pose that demonstrate significant luminance drop, as well as quick luminance recovery to one or both sides. One example of features that may include such points include the region between the fingers of the closed palm, one finger raised, two fingers raised, etc. gestures. Of course, such gestures are enumerated for the sake of example, and it should be understood that the gesture detection filters described herein may be employed to detect other gestures. For the sake of clarity and ease of understanding however, the present disclosure will describe the gesture detection filter in the context of a filter that may be particularly suitable for detecting the closed palm gesture.

Before discussing the operation of the gesture detection filter in detail, it is again noted that an object detector such as a Viola-Jones detector may be configured to produce an output in which detected gestures (hits) are associated with location indicia. The location indicia may define a "window" of the input image in which a hit was detected. For example, the location indicia may include X and Y pixel coordinates $(X_o, Y_o)$ corresponding to one of the corners of a quadrilateral shaped window, along with a width (W) and a height (H). In some embodiments $X_o$ and $Y_o$ correspond to the upper left corner of the window. This concept is shown in FIG. 5A, in which window 505 is defined by an upper left corner having pixel coordinates $X_0$, $Y_0$, a height (H) and a width (Y). Of course, the use of a quadrilateral shaped window is for the sake of example only, and any suitable geometry may be used.

As may be appreciated, a number of hits may be included in the output of the object detector. For example, the object detect may (accurately or inaccurately) detect a plurality of gestures in a single image, and therefore may include a plurality of hits in its output, defining a plurality of windows. Therefore while the present disclosure focuses on using the closed palm filter to analyze one window in the output, it should be understood that the operations described may be performed on other windows as well, either concurrently, sequentially, or in some other manner.

In any case, the gesture detection filters of the present disclosure may accept one of the windows in output of the object detector as an input. As will be described in detail below, the gesture detection filters described herein may then execute one or more filter operations on the window in an attempt to classify it as a true hit or a false positive for the closed palm pose. Further details of such operations are provided below, with reference to FIGS. 3 and 5A-5D.

Before discussing the operations of the gesture detection filter in detail, it is noted that the filters described herein may be parameterized by a set of eleven values, which may be determined by a training process. In some embodiments these values may be expressed as fractions of pixel intensity sums or window dimensions, and may be used to quantitatively assess whether luminance minima identified in the window or sub window under consideration meet certain characteristics, such as significant luminance drop, quick luminance recovery, combinations thereof, and the like. The parameters of the filters are as follows:

Local distance lower and upper bounds: $d_l$, $d_u$. As will be discussed, these values may represent lower and upper bounds of a finger width and are expressed as fractions of the input window width W.

Luminance drop factor: D. This factor reflects the least luminance value drop required for designating a luminance minimum as a point having significant luminance drop. It is expressed as a fraction of the average luminance around a potential finger boundary area.

Luminance recovery factor: R. This factor reflects the threshold amount of luminance value recovery that is needed to designate a luminance minimum as a point having quick luminance recovery. It is expressed as a percentage of the difference between the luminance at a luminance minimum and the average luminance around this minimum.

Luminance recovery upper bound: $r_u$. This parameter reflects the maximum distance between two points around a luminance minimum where luminance value recovery is detected. This factor may be used in the determination of whether a luminance minimum is to be designated as a point having quick luminance recovery, and is expressed as a fraction of the width (W) of the input window.

x- and y-coordinate upper and lower bounds: $x_l$, $x_u$, $y_l$, $y_u$. These parameters indicate the four corners of a window or subwindow where scans (discussed below) may be performed. They are expressed as fractions of the input window width and height respectively. For example, a sub-window may have an upper left corner located at pixel coordinates $(W \cdot x_l, H \cdot y_l)$, width equal to $W \cdot (x_u - x_l)$ and height equal to $H \cdot (y_u - y_l)$.

Number of scans: T. This is the number of scans that may be performed inside a window or subwindow. In some embodiments scans may be equally spaced along the y-axis inside a sub-window of a window under consideration. In some instances if the height of the sub-window $H \cdot (y_u - y_l)$ is smaller than T, the number of trials T performed may equal $H \cdot (y_u - y_l)$ and the spacing between trials in the y-axis may be equal to 1 pixel.

Number of successful scans: S'. This is the number of successful scans that are required in order for the input window to be classified as a gesture under consideration, such as the closed palm.

Figure 3:
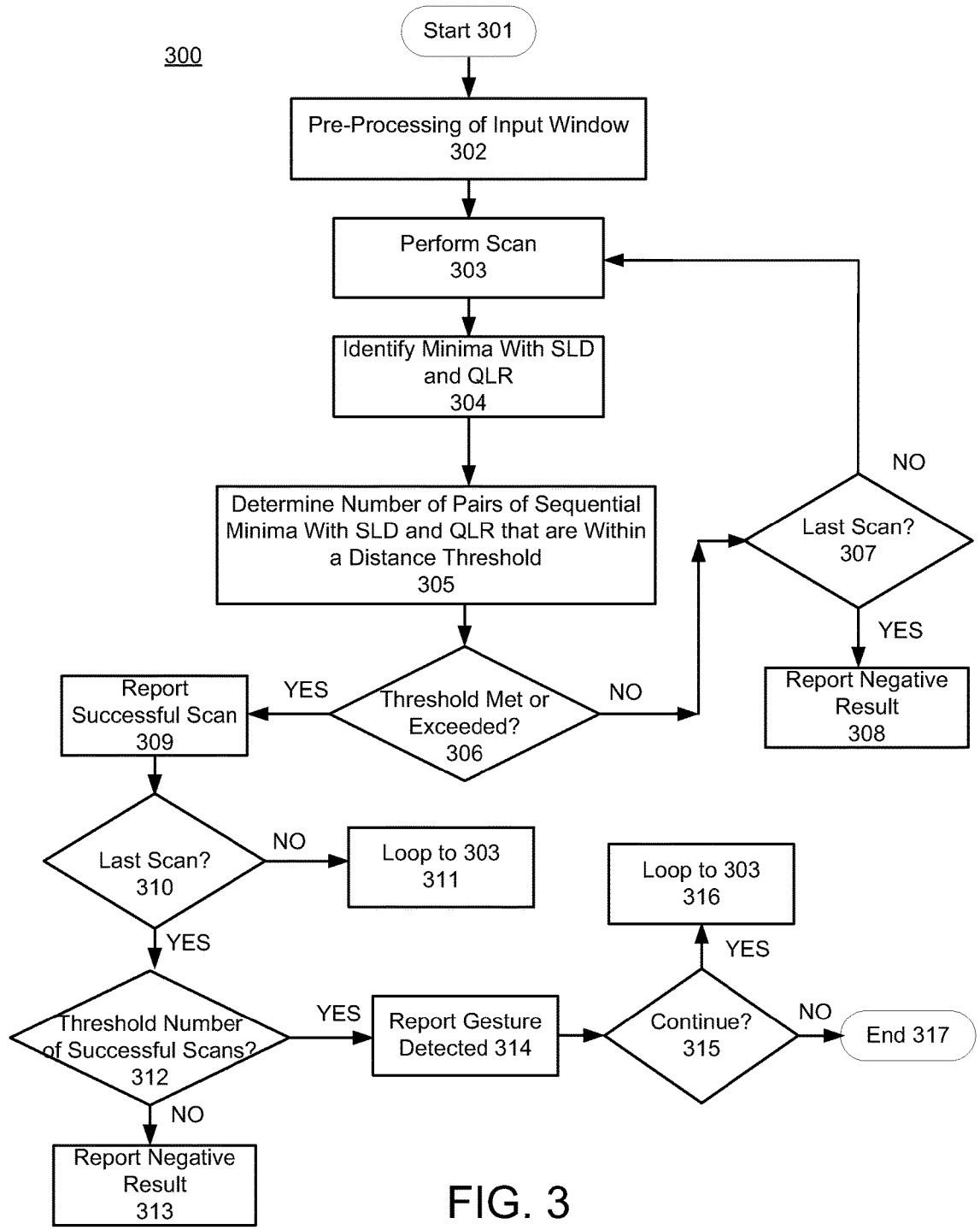
FIG. 3 is a flow chart of example operations consistent with a gesture recognition method employing a custom filter consistent with the present disclosure.

With the foregoing in mind reference is made to FIG. 3, which is a flow chart depicting example operations of one embodiment of a gesture detection filter method consistent with the present disclosure. As shown, the method 300 may begin at block 301. At or before this point, the gesture detection filter may have received and/or extracted an input window defining a region of the input image under consideration from the output of an object detector (e.g., object detector 107 described above).

The method may then proceed to block 302, wherein one or more pre-processing operations may be performed on the input window or a sub-window thereof. In some embodiments, the pre-processing operations may include analyzing the window (or, more particularly, the portion of the input image defined by the window) for grayscale pixel data. In instances where the window does not include grayscale pixel data, the pre-processing operations may include image processing on the window such that it includes grayscale pixel data. In some embodiments, the gesture detection filter may also perform brightness and/or contrast enhancement on the pixels of the input window or a sub-window thereof. As may be appreciated, such operations may increase the contrast between relatively light and relatively dark pixels in the window under consideration. For example in some embodiments, contrast and/or brightness enhancement may be performed to increase the contrast between fingers of a closed palm or other hand gesture.

Contrast and/or brightness enhancement may be performed in any suitable manner. In some embodiments, contrast and/or brightness enhancement may be or include a stretch operation on the window or sub-window under consideration. Without limitation, The stretch operation may be performed by determining a maximum pixel intensity (K) and minimum pixel intensity ($m_1$) within the window or subwindow under consideration, wherein $M_1$ and $m_1$ may be determined with equations (I) and (II) below:

$$M_1 = \max\{I(p_i): \text{pixel } p_i \in \text{input window}\}; \quad (I)$$

$$m_1 = \min\{I(p_i): \text{pixel } p_i \in \text{input window}\}. \quad (II)$$

in which $I(p_i)$ is the intensity of each pixel in the input window or sub-window.

From $M_1$ and $m_1$, an initial luminance range $R_1$ may be calculated using equation (III) below:

$$R_1 = M_1 - m_1. \quad (III)$$

A second, 'stretched' maximum pixel intensity $M_2$ may then be calculated using equation (IV) below:

$$M_2 = M_1 + (255 - M_1) \cdot f. \quad (IV)$$

where f is the image enhancement factor and is set to a constant value reflecting the widening of the range of pixel luminance values that may occur in a window. In some embodiments f may range from about 0.7 to about 0.95, and in one non-limiting embodiment f is about 0.9.

With the foregoing in mind, a stretch luminance amount S associated with maximum intensity $M_1$ may be calculated using equation (V) below:

$$S = (255 - M_1) \cdot f. \quad (V)$$

A second minimum pixel intensity $m_2$ and a new stretched luminance range $R_2$ may then be calculated using equations (VI) and (VII) below:

$$m_2 = m_1 \cdot (1-f); \quad (VI)$$

$$R_2 = M_2 - m_2. \quad (VII)$$

Finally, the intensity $I(p_i)$ of each pixel $p_i$ in the input window or sub-window is replaced by a second intensity $I'(p_i)$, which may be determined using equation (VIII) below:

$$I'(p_i) \leftarrow m_2 + (I(p_i) - m_1) \frac{R_2}{R_1} \quad (VIII)$$

Of course the above noted pre-processing operations are for the sake of example only, and other image processing operations may also be performed. For example, in some embodiments one or more other image processing operations such as de-noising, de-blurring, sharpening, histogram equalization, etc. is/are also performed on the window. Such operations may be performed as an alternative or in addition to the brightness and contrast enhancement discussed above.

Returning to FIG. 3, after pre-processing of the input window is complete the method may proceed to block 303. Pursuant to block 303 a scanning operation (a "scan") may be performed on a portion of the input window. In general, a scan may include analyzing the input window horizontally at different y coordinate values. This concept is shown in FIG. 5B, in which scan line 501 represents one scanning operation within window 505. During a scan, the gesture detection filter described herein attempts to identify local luminance minima (referred to below simply as "luminance minima") along a scan line, such as but not limited to scan line 501.

For example, in some embodiments during a scan the gesture recognition filter may examine pixels $p_i$ along a horizontal line (e.g., scan line 501) of a window or a sub-window defined by parameters $x_l, x_u, y_l, y_u$. The operations performed in an example scan consistent with the present disclosure are described below.

In some embodiments a scan may be initiated by determining a set of luminance minima $\overline{L}_1$ in a scan line, wherein $\overline{L}_1$ may be defined using equation (IX) below:

$$\overline{L}_1 = \{p_i: I(p_i) \leq I(p_{i-1}), I(p_i) \leq I(p_{i+1})\} \quad (IX)$$

in which the i is the index of each pixel $p_i$, and may also refer to the index of the column where pixel $p_i$ is located inside a scan line.

Thereafter, the scan may find sequences $p_j, p_{j+1}, \ldots, p_k$ of pixels having the same or about the same (e.g., +/−5%) luminance in $\overline{L}_1$ and replace those elements with a single luminance minima equal to $p_{\lfloor j+k/2 \rfloor}$. In some embodiments such sequences may contain elements associated with the same grayscale pixel intensity. As may be appreciated, this operation replaces the sequence $p_j, p_{j+1}, \ldots, p_k$ of pixels with a single element (e.g., pixel or group of pixels) that is located in the middle of the sequence. As may become apparent from the following discussion, this may aid in computing the distance between features within the window or sub-window under consideration, such as but not limited to the boundaries between fingers, e.g., in a closed palm gesture. This may be particularly true in instances where the features involved may span several pixels with the same or substantially the same luminance (intensity) value. The outcome of the above operations is generally illustrated in FIG. 5C, in which luminance minima 502 are luminance minima that were identified along scan line 501 in accordance with one scan performed within window 505.

As noted above scan operations need not occur on the entirety of window 505. Indeed in some embodiments the scanning operations may be performed within sub-windows of window 505. As may be appreciated, a sub-window may be a region within window 505, such that a plurality of sub-windows may exist within a single window. In such instances the dimensions of each sub-window may be determined by training or other considerations. In any case, the performance of scanning operations within a sub-window is substantially the same as that described above in connection with the performance of scanning operations in a window. Such operations is therefore not be reiterated for the sake of brevity.

Returning to FIG. 3, the method may then proceed to block 304, wherein the gesture detection filter may perform operations to identify which of a first set ($\overline{L}_1$) of luminance minima identified along a scan line (e.g., which of luminance minima 502) exhibit significant luminance drop (SLD) and quick luminance recovery (QLR). More specifically, the filter may perform operations to identify a second set ($\overline{L}_2$, where $\overline{L}_2 \subset \overline{L}_1$) of luminance minima having SLD, and to use that second set to determine a third set ($\overline{L}_3$, where $\overline{L}_3 \subset \overline{L}_2$) containing the luminance minima of the first set that also exhibit QLR.

In this regard, in some embodiments the gesture detection filter may determine whether a pixel $p_i$ (e.g., one of luminance minima 502) in the set $\overline{L}_1$ (i.e., $p_i \in \overline{L}_1$) should be included in the set $\overline{L}_2$ by analyzing the average luminance to the left and right of the pixel $p_i$. Specifically, the filter may determine an average luminance 'left' value $l_1$ and an average luminance 'right' value $l_r$ around pixel $p_i$ using equation (X) below:

$$l_1 \leftarrow \frac{\sum_{j=i-d_{av}}^{i} I(p_j)}{d_{av}+1}, l_r \leftarrow \frac{\sum_{j=i}^{i+d_{av}} I(p_j)}{d_{av}+1}, \text{ where } d_{av} = \frac{d_u+d_l}{2} \cdot W \quad (X)$$

The gesture recognition filter may then determine a luminance drop value, d, using equation (XI) below $$d = D \cdot \max(l_1, l_r) \quad (XI)$$

in which pixel $p_i$ is included in the set $\overline{L}_2$ if and only if $I(p_i) < \max(l_1, l_r) - d$.

Once d is determined, the gesture recognition filter may perform operations to determine which of the luminance minima (e.g., which of luminance minima 502) in the second set $\overline{L}_2$ exhibits QLR. More specifically, the gesture recognition filter may determine a third set $\overline{L}_3$, where $\overline{L}_3 \subset \overline{L}_2$ and is populated by minima of $\overline{L}_2$ that exhibit QLR. In some embodiments, the gesture recognition filter may initiate the determination of which of the minima in $\overline{L}_2$ exhibit QLR by determining an average luminance value left ($l_1$) and aver-age luminance value right ($l_r$) value around a pixel $p_i$ in set $\overline{L}_2$ (i.e., $p_i \in \overline{L}_2$), in the same manner shown in formula (X) above.

Once the average luminance left and right values have been calculated, the gesture recognition filter may then determine a recovery left value $r_l$ and a recovery right value $r_r$ value, which may be determined using equations (XII) and (XIII) below:

$$r_l \leftarrow I(p_i) + R \cdot (l_k - I(p_i)); \quad (XII)$$

$$r_r \leftarrow I(p_i) + R \cdot (l_r - I(p_i)) \quad (XIII)$$

In general, $r_l$ and $r_r$ may be image and pixel specific, and represent the threshold amount of pixel luminance that needs to be present to the left and right of pixel $p_i$, respectively, in order for pixel $p_i$ to be considered to exhibit QLR.

The gesture recognition filter may then use $r_l$ and $r_r$ to determine a left marker ($m_l < i$) and a right marker ($m_r > i$), wherein the left marker is the index of the rightmost pixel $p_{m_l}$ having an intensity $I(p_{m_l})$ that is greater than $r_l$ (i.e., $I(p_{m_l}) > r_l$), and the right marker is the index of the leftmost pixel $p_{m_r}$ having an intensity $I(p_{m_r})$ that is greater than $r_r$, i.e., where ($I(p_{m_r}) > r_r$). In general, the left and right markers indicate the closest pixels to the minimum under consideration for which the luminance (intensity) is greater than $r_l$ and $r_r$, respectively. With this in mind, pixel $p_i$ may be included the set $\overline{L}_3$ if and only if the following relationship is met:

$$m_r - m_l - 1 < W \cdot r_u \quad (XIV)$$

Where W is the width of the input window and $r_u$ is the luminance recovery upper bound, as described above. In general, $r_u$ may be range from about 0.05 to about 0.15, and in some embodiments is about 0.06. When relationship (XIV) is met, the gesture recognition filter may determine the distance between the left and right markers small enough to identify pixel $p_i$ as exhibit QLR.

As explained above, gesture recognition filter may perform various image processing operations to determine which minima identified along a scan line (e.g., which of luminance minima 502 in FIG. 5C) exhibit QLD and QLR. With this in mind, the gesture recognition filter may discard luminance minima that are determined to not exhibit both QLD and QLR. Conversely, the gesture recognition filter may retain luminance minima that exhibit QLD and QLR for further processing. This concept is generally illustrated by FIG. 5D, wherein luminance minima 502' represent a subset (e.g., $\overline{L}_3$) of luminance minima 502 (e.g., $\overline{L}_2$), and which exhibit both QLD and QLR.

Returning to FIG. 3, once luminance minima exhibiting both QLD and QLR have been identified the method may proceed from block 304 to block 305, wherein the distance between sequential luminance minima in the third set $\overline{L}_3$ is compared to a distance threshold, and the number of pairs of sequential luminance minima in $\overline{L}_3$ that are within the distance threshold is tallied. In this context, the threshold distance may correlate to one or more features of a gesture of interest such as the closed palm. For example, in some embodiments the threshold distance may correlate to an average distance between two or more fingers in the gesture of interest. This concept is illustrated in FIG. 5D, which depicts sequential minima 502' as being separated by a distance $d_i$, where $d_i$ is the width of the ring finger.

While the following discussion will focus on embodiments in which a single threshold is applied to each pair of sequential luminance minima in the third set $\overline{L}_3$, it should be understood that such discussion is for the sake of example and that more than one threshold distance may be employed. For example, multiple threshold distances each correlating to the average width of one of the fingers of the human hand may be employed. This concept is also illustrated in FIG. 5D, wherein D is the average width of the ring finger, D' is the average width of the middle finger, and D" is the average width of the index finger, etc. In any case, the threshold distance may be determined by training the filter or some other suitable means.

With the foregoing in mind, in some embodiments the gesture recognition filter employs distance threshold that is defined by relationship (XV) below:

$$W \cdot d_l < d_i < W \cdot d_u \qquad (XV)$$

where W is the width of the input window, $d_l$ and $d_u$ are the upper and lower bounds correlating to the average width of a human finger, and $d_i$ is the distance between two consecutive minima in set $\overline{L}_3$. The values of $d_l$ and $d_u$ may be set in any suitable manner, such as by training the filter or through some other means. In some embodiments, $d_l$ is about 0.15 and $d_u$ is about 0.3, though of course other values may be used.

Returning again to FIG. 3, pursuant to block 305 the gesture detection filter may determine how many sequential pairs of luminance minima in the third set $\overline{L}_3$ are within a threshold distance of each other, as previously described. The method may then proceed to block 306, wherein a determination may be made as to whether the number of pairs of sequential luminance minima that are within the threshold distance meets or exceeds a threshold number (Q). In this regard the threshold number (Q) may be set to any suitable value, such as 1, 2, 3, etc., and may be set in any suitable manner. For example, the threshold number (Q) may be set by training, by the number of fingers remaining turned towards the palm in a hand gesture, or in some other manner. In some embodiments, the threshold number of adjacent luminance minima is set based on the number of fingers that remain curled towards the palm in a hand gesture of interest. For example where the number of fingers curled towards the palm in a hand gesture is 4 (e.g., as shown in the example of the closed palm gesture in FIG. 5D), the threshold number of sequential luminance minima may be set to three.

If the number of pairs of sequential luminance minima within the distance threshold is less than the threshold number (Q), the method may proceed to block 307, wherein a determination may be made as to whether the scan under consideration is the last scan. If not the method may loop back to block 303, wherein another scan may be performed. But if so the method may proceed from block 307 to block 308, wherein a negative result (e.g., gesture not detected) may be reported.

Returning to block 306, if the number of pairs of sequential luminance minima within the distance threshold is greater than or equal to the threshold number (Q) the method may proceed to block 309, wherein the scan under consideration may be considered a successful scan. The method may then proceed to block 310, wherein a determination may be made as to whether the scan under consideration is the last scan. If not the method may proceed to block 311, pursuant to which the method may loop to block 303 and another scan may be performed.

If the scan under consideration is the last scan however, the method may proceed from block 310 to block 312, wherein a determination may be made as to whether the number of scans (S) that are successful meets or exceeds a threshold number of successful scans (S'). Like the threshold number (Q), the threshold number of successful scans (S') may be set in any suitable manner, such as but not limited to by training. In any case, it may be desired to set the threshold number of successful scans (S') to a value that may attain a desired degree of gesture detection accuracy. In any case, if the number of scans (S) that are successful is less than S', the method may proceed to block 313, wherein a negative result (e.g., no gesture detected) may be reported. Alternatively if the number of scans (S) that are successful is greater than or equal to S', the method may proceed to block 314, wherein the gesture under consideration is reported as detected.

The method may then proceed to block 315, wherein a determination may be made as to whether the analysis is to continue (e.g., on additional images). If so the method may proceed to block 316 and loop back to block 303, wherein a scan may be performed on another input window. If analysis is not to continue however, the method may proceed from block 315 to block 317 and end.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a method for performing two-dimensional gesture recognition, including: performing at least one scan on a portion of an input image with an object detector to detect a gesture therein and produce a first set of hits, wherein each hit in the first set of hits is associated with location indicia and size identifying a location in the input image at which the gesture is detected; and applying a filter to the first set of hits so as to remove at least one false positive hit contained therein.

Example 2

This example includes any or all of the features of example 1, wherein the object detector employs a scan stage, feature extraction stage, and a classification stage.

Example 3

This example includes any or all of the features of example 2, wherein the object detector is a Viola-Jones detector, and the scanning includes analyzing the input image with the Viola-Jones detector based on Haar features associated with the gesture.

Example 4

This example includes any or all of the features of example 3, wherein the Haar features are selected from the group consisting of vertical, horizontal or 45 degree Haar features and combinations thereof.

Example 5

This example includes any or all of the features of any one of examples 1 to 4, and further includes performing a pre-processing operation on the input image prior to the scanning.

Example 6

This example includes any or all of the features of example 5, wherein the pre-processing operation includes at least one of a de-noising operation, an illumination enhancement operation, a sharpening operation, and an image rotation operation.

Example 7

This example includes any or all of the features of example 6, wherein the pre-processing operation includes performing an image rotation operation that is configured to make the scanning rotation invariant.

Example 8

This example includes any or all of the features of example 6, wherein the pre-processing operation includes performing an image rotation operation, the image rotation operation including rotating the input image to produce a set of rotated images.

Example 9

This example includes any or all of the features of example 8, wherein the scanning includes: scanning each rotated image in the set of rotated images to detect one or more gestures and to produce one or more hits associated with a gesture detected in the rotated images; and consolidating hits detected in a threshold number of rotated images to produce a consolidated set of hits, wherein the consolidated set of hits is included in the first set of hits.

Example 10

This example includes any or all of the features of any one of examples 1 to 4, wherein the scanning includes analyzing the portion of the input image at least in part using landmark detection.

Example 11

This example includes any or all of the features of example 10, wherein the landmark detection includes processing the portion of the input image to detect landmarks of the gesture.

Example 12

This example includes any or all of the features of example 11, wherein the landmarks do not significantly expose a background of the input image.

Example 13

This example includes any or all of the features of example 12, wherein the gesture is a hand gesture and the landmarks comprise at least one of an upper palm of a human hand, knuckles of a human hand, and a region between fingers of a human hand or a combination thereof.

Example 14

This example includes any or all of the features of example 10, and further includes segmenting one or more regions around a detected landmark from the background, so as to produce at least one segmented portion.

Example 15

This example includes any or all of the features of example 10, and further includes performing at least one shape matching operation on the portion of the input image.

Example 16

This example includes any or all of the features of any one of examples 1 to 4, wherein applying the filter includes applying at least one of a temporal filter, a skin filter, and a structure filter to the first set of hits.

Example 17

This example includes any or all of the features of any one of examples 1 to 4, wherein applying the filter includes applying a temporal filter to the first set of hits, and the method further includes: analyzing a series of input images for a gesture contained therein and to produce a corresponding series of hit sets, the series of hit sets including a first set of hits for each of the series of input images, each hit of each first set of hits being associated with location indicia identifying a location in at least one of the series of input images at which the gesture was detected; and analyzing the series of hit sets and retaining hits that are identified in the same or about the same location in greater than or at equal to a threshold number of the series of input images.

Example 18

This example includes any or all of the features of any one of examples 1 to 4, wherein: applying the filter includes applying a skin filter to the first set of hits, and the method further includes: analyzing the input image in a region corresponding to the location indicia identified in the first set of hits against a skin model defined by the skin filter; and discarding hits in the first set of hits that are associated with location indicia that identify a location in the input image that does not satisfy the skin model.

Example 19

This example includes any or all of the features of example 18, wherein the skin model includes at least one of a skin reflectance model, a skin color model, a skin radiance model, and a skin texture model.

Example 20

This example includes any or all of the features of any one of examples 1 to 4, wherein applying the filter includes applying a closed palm filter to the first set of hits.

Example 21

This example includes any or all of the features of example 20, wherein applying the closed palm filter includes: defining an input window in the input image based at least in part on location indicia associated with at least one hit in the first set of hits; performing a scanning operation on at least a portion of the input window along at least one scan line to detect a plurality of luminance minima along the at least one scan line and produce a first set of luminance minima containing the plurality of luminance minima; determining which luminance minima in the first set of luminance minima exhibit significant luminance drop; and when at least one luminance minima exhibits significant luminance drop, producing a second set of luminance minima containing only the luminance minima exhibiting luminance drop.

Example 22

This example includes any or all of the features of example 21, and further includes: determining whether any of the luminance minima in the second set exhibit quick luminance recovery; and when at least one luminance minima in the second set exhibits quick luminance recovery, producing a third set including only the luminance minima that exhibit both significant luminance drop and quick luminance recovery.

Example 23

This example includes any or all of the features of example 22, wherein when the third set includes a plurality of luminance minima, the method further includes determining whether a distance ($d_i$) between a pair of sequential luminance minima of the plurality of luminance minima in the third set is within a distance threshold.

Example 24

This example includes any or all of the features of example 23, wherein the distance threshold is a threshold distance relationship defined by the expression: $W \cdot d_l < d_i < W \cdot d_u$ in which W is the Width of the input window; $d_i$ is the distance between the first luminance minima and the second luminance minima; and $d_l$ and $d_u$ are a lower bound and an upper bound, respectively, and correspond to an average width of a human finger.

Example 25

This example includes any or all of the features of example 23, and further includes: determining the total number of pairs of sequential luminance minima in the third set which satisfy the distance threshold relationship; comparing the total number of pairs of sequential luminance minima to a threshold number; and when the total number of pairs of sequential luminance minima meets or exceeds the threshold number, identify the at least one scan as a successful scan.

Example 26

This example includes any or all of the features of example 25, wherein the at least one scan includes a plurality of scans, and the method further includes: determining a total number of successful scans from the plurality of scans; comparing the total number of successful scans to a threshold number of successful scans; and when the total number of successful scans meets or exceeds the threshold number of successful scans, indicate that a closed palm gesture has been detected.

Example 27

According to this example there is provided a system for performing two-dimensional gesture recognition, including: a processor communicatively coupled to a memory; a gesture recognition module, including: an object detector to perform at least one scan on at least a portion of an input image to detect a gesture therein and produce a first set of hits, wherein each hit in the first set of hits is associated with location indicia identifying a location in the input image at which the gesture is detected; and a filter; wherein the gesture recognition module is to apply the filter to the first set of hits so as to remove at least one false positive hit contained therein.

Example 28

This example includes any or all of the features of example 27, wherein the object detector is configured to employ a scan stage, feature extraction stage, and a classification stage.

Example 29

This example includes any or all of the features of example 28, wherein the object detector is a Viola-Jones detector, and said scan includes is to analyze the input image with the Viola-Jones detector based on Haar features associated with said gesture.

Example 30

This example includes any or all of the features of example 29, wherein said Haar features are selected from the group consisting of vertical, horizontal or 45 degree Haar features and combinations thereof.

Example 31

This example includes any or all of the features of any one of examples 27 to 29, wherein the gesture recognition module is further to perform a pre-processing operation on said input image prior to said scanning Example 32

This example includes any or all of the features of example 31, wherein said pre-processing operation includes at least one of a de-noising operation, an illumination enhancement operation, a sharpening operation, and an image rotation operation.

Example 33

This example includes any or all of the features of example 32, wherein said pre-processing operation includes performing an image rotation operation that is configured to make said scanning rotation invariant.

Example 34

This example includes any or all of the features of example 32, wherein said pre-processing operation includes performing an image rotation operation, said image rotation operation including rotating the input image to produce a set of rotated images.

Example 35

This example includes any or all of the features of example 34, wherein said object detector is further to perform said at least one scan at least in part by: scanning each rotated image in said set of rotated images to detect one or more gestures and to produce one or more hits associated with a gesture detected in said rotated images; and consolidating hits detected in a threshold number of rotated images to produce a consolidated set of hits, wherein the consolidated set of hits is included in said first set of hits.

Example 36

This example includes any or all of the features of any one of examples 27 to 29, wherein the object detector is further to perform said at least one scan at least in part by analyzing the at least a portion of the input image at least in part using landmark detection.

Example 37

This example includes any or all of the features of example 36, wherein said landmark detection includes processing the portion of the input image to detect landmarks of said gesture.

Example 38

This example includes any or all of the features of example 37, wherein said landmarks do not significantly expose a background of said input image.

Example 39

This example includes any or all of the features of example 38, wherein said gesture is a hand gesture and said landmarks comprise at least one of an upper palm of a human hand, knuckles of a human hand, a region between fingers of a human hand or a combination thereof.

Example 40

This example includes any or all of the features of example 36, wherein said gesture recognition module is further to segment one or more regions around a detected landmark from said background, so as to produce at least one segmented portion.

Example 41

This example includes any or all of the features of example 36, wherein said gesture recognition module is further to perform at least one shape matching operation on the portion of the input image.

Example 42

This example includes any or all of the features of any one of examples 27 to 29, wherein said filter includes at least one of a temporal filter, a skin filter, and a structure filter.

Example 43

This example includes any or all of the features of any one of examples 27 to 29, wherein: said filter includes a temporal filter; the gesture recognition module is to apply said temporal filter to said first set of hits, and said object detector is to perform at least one scan on a series of input images for a gesture contained therein and to produce a corresponding series of hit sets, said series of hit sets including a first set of hits for each of said series of input images, each hit of each first set of hits being associated with location indicia identifying a location in at least one of said series of input images at which the gesture was detected; and said object detector is further to analyze said series of hit sets and retain hits that are identified in the same or about the same location in greater than or at equal to a threshold number of said series of input images.

Example 44

This example includes any or all of the features of any one of examples 27 to 29, wherein said filter includes a skin filter, and said gesture recognition module is further to analyze the input image in a region corresponding to the location indicia identified in the first set of hits against a skin model defined by said skin filter; and discard hits in the first set of hits that are associated with location indicia that identify a location in the input image that does not satisfy the skin model.

Example 45

This example includes any or all of the features of example 44, wherein said skin model includes at least one of a skin reflectance model, a skin color model, a skin radiance model, and a skin texture model.

Example 46

This example includes any or all of the features of any one of examples 27 to 29, wherein said filter includes a closed palm filter.

Example 47

This example includes any or all of the features of example 46, wherein said gesture recognition module is to apply said closed palm filter to said first set of hits at least in part by: defining an input window in said input image based at least in part on location indicia associated with at least one hit in said first set of hits; performing a scanning operation on at least a portion of the input window along at least one scan line to detect a plurality of luminance minima along said at least one scan line and produce a first set of luminance minima containing said plurality of luminance minima; determining which luminance minima in the first set of luminance minima exhibit significant luminance drop; and when at least one luminance minima exhibits significant luminance drop, producing a second set of luminance minima containing only the luminance minima exhibiting luminance drop.

Example 48

This example includes any or all of the features of example 47, wherein the gesture recognition module is further to: determine whether any of the luminance minima in the second set exhibit quick luminance recovery; and when at least one luminance minima in the second set exhibits quick luminance recovery, produce a third set including only the luminance minima that exhibit both significant luminance drop and quick luminance recovery.

Example 49

This example includes any or all of the features of example 48, wherein when the third set includes a plurality of luminance minima, the gesture recognition module is further to: determine whether a distance ($d_i$) between a pair of sequential luminance minima of said plurality of luminance minima in the third set is within a distance threshold.

Example 50

This example includes any or all of the features of example 49, wherein the distance threshold is a threshold distance relationship defined by the expression: $W \cdot d_l < d_i < W \cdot d_u$, in which W is the Width of the input window; $d_i$ is the distance between the first luminance minima and the second luminance minima; and $d_l$ and $d_u$ are a lower bound and an upper bound, respectively, and correspond to an average width of a human finger.

Example 51

This example includes any or all of the features of example 49, wherein the gesture recognition module is further to: determine the total number of pairs of sequential luminance minima in the third set which satisfy the distance threshold relationship; compare said total number of pairs of sequential luminance minima to a threshold number; and when said total number of pairs of sequential luminance minima meets or exceeds the threshold number, identify the at least one scan as a successful scan.

Example 52

This example includes any or all of the features of example 51, wherein said object detector is to perform a plurality of scans on the portion of the input image, and gesture recognition module is further to: determine a total number of successful scans from the plurality of scans; compare the total number of successful scans to a threshold number of successful scans; and when the total number of successful scans meets or exceeds the threshold number of successful scans, indicate that a closed palm gesture has been detected.

Example 53

According to this example there is provided at least one computer readable medium including computer readable instructions for performing two-dimensional gesture recognition, wherein the instructions when executed by a processor cause the performance of the following operations including: performing at least one scan on a portion of an input image with an object detector to detect a gesture therein and produce a first set of hits, wherein each hit in the first set of hits is associated with location indicia and size identifying a location in the input image at which the gesture is detected; and applying a filter to the first set of hits so as to remove at least one false positive hit contained therein.

Example 54

This example includes any or all of the features of example 53, wherein the object detector employs a scan stage, feature extraction stage, and a classification stage.

Example 55

This example includes any or all of the features of example 54, wherein the object detector is a Viola-Jones detector, and performing the at least one scan includes analyzing the input image with the Viola-Jones detector based on Haar features associated with the gesture.

Example 56

This example includes any or all of the features of example 55, wherein the Haar features are selected from the group consisting of vertical, horizontal or 45 degree Haar features and combinations thereof.

Example 57

This example includes any or all of the features of any one of examples 53 to 56, wherein the instructions when executed by the processor further cause the performance of the following operations including: performing a pre-processing operation on the input image prior to the scanning.

Example 58

This example includes any or all of the features of example example 57, wherein the pre-processing operation includes at least one of a de-noising operation, an illumination enhancement operation, a sharpening operation, and an image rotation operation.

Example 59

This example includes any or all of the features of example 58, wherein the pre-processing operation includes performing an image rotation operation that is configured to make the scanning rotation invariant.

Example 60

This example includes any or all of the features of example 58, wherein the pre-processing operation includes performing an image rotation operation, and the image rotation operation including rotating the input image to produce a set of rotated images.

Example 61

This example includes any or all of the features of example 60, where performing the at least one scan includes: scanning each rotated image in the set of rotated images to detect one or more gestures and to produce one or more hits associated with a gesture detected in the rotated images; and consolidating hits detected in a threshold number of rotated images to produce a consolidated set of hits, wherein the consolidated set of hits is included in the first set of hits.

Example 62

This example includes any or all of the features of any one of examples 53 to 56, wherein performing the at least one scan includes analyzing the at least a portion of the input image at least in part using landmark detection.

Example 63

This example includes any or all of the features of example 62, wherein the landmark detection includes processing the portion of the input image to detect landmarks of the gesture.

Example 64

This example includes any or all of the features of example 63, wherein the landmarks do not significantly expose a background of the input image.

Example 65

This example includes any or all of the features of example 64, wherein the gesture is a hand gesture and the landmarks comprise at least one of an upper palm of a human hand, knuckles of a human hand, a region between fingers of a human hand or a combination thereof.

Example 66

This example includes any or all of the features of example 63, wherein the instructions when executed further cause the performance of the following operations including: segmenting one or more regions around a detected landmark from the background, so as to produce at least one segmented portion.

Example 67

This example includes any or all of the features of example 63, wherein the instructions when executed cause the performance of the following operations including: performing at least one shape matching operation on the portion of the input image.

Example 68

This example includes any or all of the features of any one of examples 53 to 56, wherein applying the filter includes applying at least one of a temporal filter, a skin filter, and a structure filter to the first set of hits.

Example 69

This example includes any or all of the features of any one of examples 53 to 56, wherein applying the filter includes applying a temporal filter to the first set of hits, and the instructions when executed further cause the performance of the following operations including: analyzing a series of input images for a gesture contained therein and to produce a corresponding series of hit sets, the series of hit sets including a first set of hits for each of the series of input images, each hit of each first set of hits being associated with location indicia identifying a location in at least one of the series of input images at which the gesture was detected; and analyzing the series of hit sets and retaining hits that are identified in the same or about the same location in greater than or at equal to a threshold number of the series of input images.

Example 70

This example includes any or all of the features of any one of examples 53 to 56, wherein applying the filter includes applying a skin filter to the first set of hits, and the instructions when executed further cause the performance of the following operations including: analyzing the input image in a region corresponding to the location indicia identified in the first set of hits against a skin model defined by the skin filter; and discarding hits in the first set of hits that are associated with location indicia that identify a location in the input image that does not satisfy the skin model.

Example 71

This example includes any or all of the features of example 70, wherein the skin model includes at least one of a skin reflectance model, a skin color model, a skin radiance model, and a skin texture model.

Example 72

This example includes any or all of the features of any one of examples 53 to 56, wherein applying the filter includes applying a closed palm filter to the first set of hits.

Example 73

This example includes any or all of the features of example 72, wherein applying the closed palm filter includes: defining an input window in the input image based at least in part on location indicia associated with at least one hit in the first set of hits; performing a scanning operation on at least a portion of the input window along at least one scan line to detect a plurality of luminance minima along the at least one scan line and produce a first set of luminance minima containing the plurality of luminance minima; determining which luminance minima in the first set of luminance minima exhibit significant luminance drop; and when at least one luminance minima exhibits significant luminance drop, producing a second set of luminance minima containing only the luminance minima exhibiting luminance drop.

Example 74

This example includes any or all of the features of example 73, wherein the instructions when executed further cause the performance of the following operations including: determining whether any of the luminance minima in the second set exhibit quick luminance recovery; and when at least one luminance minima in the second set exhibits quick luminance recovery, producing a third set including only the luminance minima that exhibit both significant luminance drop and quick luminance recovery.

Example 75

This example includes any or all of the features of example 74, wherein when the third set includes a plurality of luminance minima, the instructions when executed further cause the performance of the following operations including: determining whether a distance ($d_i$) between a pair of sequential luminance minima of the plurality of luminance minima in the third set is within a distance threshold.

Example 76

This example includes any or all of the features of example 75, wherein the distance threshold is a threshold distance relationship defined by the expression: $W \cdot d_l < d_i < W \cdot d_u$ in which W is the Width of the input window; $d_i$ is the distance between the first luminance minima and the second luminance minima; and $d_l$ and $d_u$ are a lower bound and an upper bound, respectively, and correspond to an average width of a human finger.

Example 77

This example includes any or all of the features of example 75, wherein the instructions when executed further cause the performance of the following operations including: determining the total number of pairs of sequential luminance minima in the third set which satisfy the distance threshold relationship; comparing the total number of pairs of sequential luminance minima to a threshold number; and when the total number of pairs of sequential luminance minima meets or exceeds the threshold number, identify the at least one scan as a successful scan.

Example 78

This example includes any or all of the features of example 76, wherein performing the at least one scan includes performing a plurality of scans on the portion of the input image, and the instructions when executed further cause the performance of the following operations including: determining a total number of successful scans from the plurality of scans; comparing the total number of successful scans to a threshold number of successful scans; and when the total number of successful scans meets or exceeds the threshold number of successful scans, indicate that a closed palm gesture has been detected.

Example 79

According to this example there is provided a system for performing two-dimensional gesture recognition, comprising logic implemented at least in part in hardware to cause the system to perform the operations of the method of any one of examples 1 to 26.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method for performing 2D gesture recognition, comprising:
    performing at least one scan on a portion of an input image with an object detector to detect a gesture therein and produce a first set of hits, wherein each hit in the first set of hits is associated with location indicia and size identifying a location in the input image at which the gesture is detected; and
    applying a filter to the first set of hits so as to remove at least one false positive hit contained therein;
wherein applying said filter comprises applying a custom filter; and
applying said custom filter comprises:
    defining an input window in said input image based at least in part on location indicia associated with at least one hit in said first set of hits;
    performing a scanning operation on at least a portion of the input window along at least one scan line to detect a plurality of luminance minima along said at least one scan line and produce a first set of luminance minima containing said plurality of luminance minima;
    determining which luminance minima in the first set of luminance minima exhibit significant luminance drop; and
    when at least one luminance minima exhibits significant luminance drop, producing a second set of luminance minima containing only the luminance minima exhibiting luminance drop.

2. The method of claim 1, wherein the object detector is a Viola-Jones detector, and said scanning comprises analyzing the input image with the Viola-Jones detector based on Haar features associated with said gesture.

3. The method of claim 1, wherein said scanning comprises analyzing the portion of the input image at least in part using landmark detection.

4. The method of claim 1, wherein applying said filter further comprises applying at least one of a temporal filter, a skin filter, and a structure filter to said first set of hits.

5. The method of claim 1, wherein applying said filter further comprises applying a temporal filter to said first set of hits, and the method further comprises:
    analyzing a series of input images for a gesture contained therein and to produce a corresponding series of hit sets, said series of hit sets comprising a first set of hits for each of said series of input images, each hit of each first set of hits being associated with location indicia identifying a location in at least one of said series of input images at which the gesture was detected; and
    analyzing said series of hit sets and retaining hits that are identified in the same or about the same location in greater than or at equal to a threshold number of said series of input images.

6. The method of claim 1, wherein said custom filter is a closed palm filter.

7. The method of claim 1, further comprising:
    determining whether any of the luminance minima in the second set exhibit quick luminance recovery; and
    when at least one luminance minima in the second set exhibits quick luminance recovery, producing a third set comprising only the luminance minima that exhibit both significant luminance drop and quick luminance recovery; and
    when the third set includes a plurality of luminance minima, the method further comprises determining whether a distance ($d_i$) between a pair of sequential luminance minima of said plurality of luminance minima in the third set is within a distance threshold.

8. The method of claim 7, wherein the distance threshold is a threshold distance relationship defined by the expression:

$$w \cdot d_l < d_i < W \cdot d_u$$

in which W is the Width of the input window;
$d_i$ is the distance between the first luminance minima and the second luminance minima; and
$d_l$ and $d_u$ are a lower bound and an upper bound, respectively, and correspond to an average width of a human finger; and
the method further comprises:
    determining the total number of pairs of sequential luminance minima in the third set which satisfy the distance threshold relationship;
    comparing said total number of pairs of sequential luminance minima to a threshold number; and
    when said total number of pairs of sequential luminance minima meets or exceeds the threshold number, identify the at least one scan as a successful scan.

9. The method of claim 8, wherein said at least one scan comprises a plurality of scans, and the method further comprises:

determining a total number of successful scans from the plurality of scans;
comparing the total number of successful scans to a threshold number of successful scans; and
when the total number of successful scans meets or exceeds the threshold number of successful scans, indicate that a closed palm gesture has been detected.

10. A system for performing 2D gesture recognition, comprising a processor, a memory, and gesture recognition circuitry to perform the following operations comprising:
performing at least one scan on a portion of an input image with an object detector to detect a gesture therein and produce a first set of hits, wherein each hit in the first set of hits is associated with location indicia and size identifying a location in the input image at which the gesture is detected; and
applying a filter to the first set of hits so as to remove at least one false positive hit contained therein;
wherein applying said filter comprises applying a custom filter to said first set of hits; and
applying said custom filter comprises:
defining an input window in said input image based at least in part on location indicia associated with at least one hit in said first set of hits;
performing a scanning operation on at least a portion of the input window along at least one scan line to detect a plurality of luminance minima along said at least one scan line and produce a first set of luminance minima containing said plurality of luminance minima;
determining which luminance minima in the first set of luminance minima exhibit significant luminance drop; and
when at least one luminance minima exhibits significant luminance drop, producing a second set of luminance minima containing only the luminance minima exhibiting luminance drop.

11. The system of claim 10, wherein the object detector is a Viola-Jones detector, and said scanning comprises analyzing the input image with the Viola-Jones detector based on Haar features associated with said gesture.

12. The system of claim 10, wherein said scanning comprises analyzing the portion of the input image at least in part using landmark detection.

13. The system of claim 10, wherein applying said filter further comprises applying at least one of a temporal filter, a skin filter, and a structure filter to said first set of hits.

14. The system of claim 10, wherein applying said filter further comprises applying a temporal filter to said first set of hits, and said gesture recognition circuitry is further to perform the following operations comprising:
analyzing a series of input images for a gesture contained therein and to produce a corresponding series of hit sets, said series of hit sets comprising a first set of hits for each of said series of input images, each hit of each first set of hits being associated with location indicia identifying a location in at least one of said series of input images at which the gesture was detected; and
analyzing said series of hit sets and retaining hits that are identified in the same or about the same location in greater than or at equal to a threshold number of said series of input images.

15. The system of claim 10, wherein said custom filter is a closed palm filter.

16. The system of claim 10, wherein the gesture recognition circuitry is further to perform the following operations comprising:
determining whether any of the luminance minima in the second set exhibit quick luminance recovery; and
when at least one luminance minima in the second set exhibits quick luminance recovery, producing a third set comprising only the luminance minima that exhibit both significant luminance drop and quick luminance recovery; and
when the third set includes a plurality of luminance minima, the instructions when executed further cause the system to perform the following operations comprising:
determining whether a distance ($d_i$) between a pair of sequential luminance minima of said plurality of luminance minima in the third set is within a distance threshold.

17. The system of claim 16, wherein the distance threshold is a threshold distance relationship defined by the expression:

$$W \cdot d_l < d_i < W \cdot d_u$$

in which W is the Width of the input window;
$d_i$ is the distance between the first luminance minima and the second luminance minima; and
$d_l$ and $d_u$ are a lower bound and an upper bound, respectively, and correspond to an average width of a human finger; and
the instructions when executed further cause the system to perform the following operations comprising:
determining the total number of pairs of sequential luminance minima in the third set which satisfy the distance threshold relationship;
comparing said total number of pairs of sequential luminance minima to a threshold number; and
when said total number of pairs of sequential luminance minima meets or exceeds the threshold number, identify the at least one scan as a successful scan.

18. At least one non-transitory computer readable medium comprising computer readable instructions for performing 2D gesture recognition, wherein the instructions when executed by a processor cause the performance of the following operations comprising:
performing at least one scan on a portion of an input image with an object detector to detect a gesture therein and produce a first set of hits, wherein each hit in the first set of hits is associated with location indicia and size identifying a location in the input image at which the gesture is detected; and
applying a filter to the first set of hits so as to remove at least one false positive hit contained therein;
wherein applying said filter comprises applying a custom filter to said first set of hits; and
applying said custom filter comprises:
defining an input window in said input image based at least in part on location indicia associated with at least one hit in said first set of hits;
performing a scanning operation on at least a portion of the input window along at least one scan line to detect a plurality of luminance minima along said at least one scan line and produce a first set of luminance minima containing said plurality of luminance minima;
determining which luminance minima in the first set of luminance minima exhibit significant luminance drop; and
when at least one luminance minima exhibits significant luminance drop, producing a second set of luminance minima containing only the luminance minima exhibiting luminance drop.

19. The at least one non-transitory computer readable medium of claim 18, wherein the object detector is a Viola-Jones detector, and said scanning comprises analyzing the input image with the Viola-Jones detector based on Haar features associated with said gesture.

20. The at least one non-transitory computer readable medium of claim 18, wherein
performing said at least one scan comprises analyzing the at least a portion of the input image at least in part using landmark detection.

21. The at least one non-transitory computer readable medium of claim 18, wherein applying said filter further comprises applying at least one of a temporal filter, a skin filter, and a structure filter to said first set of hits.

22. The at least one non-transitory computer readable medium of claim 18, wherein applying said filter further comprises applying a temporal filter to said first set of hits, and said instructions when executed further cause the performance of the following operations comprising:
   analyzing a series of input images for a gesture contained therein and to produce a corresponding series of hit sets, said series of hit sets comprising a first set of hits for each of said series of input images, each hit of each first set of hits being associated with location indicia identifying a location in at least one of said series of input images at which the gesture was detected; and
   analyzing said series of hit sets and retaining hits that are identified in the same or about the same location in greater than or at equal to a threshold number of said series of input images.

23. The at least one non-transitory computer readable medium of claim 18, wherein said custom filter is a closed palm filter.

24. The at least one non-transitory computer readable medium of claim 18, wherein the instructions when executed further cause the performance of the following operations comprising:
   determining whether any of the luminance minima in the second set exhibit quick luminance recovery; and
   when at least one luminance minima in the second set exhibits quick luminance recovery, producing a third set comprising only the luminance minima that exhibit both significant luminance drop and quick luminance recovery; and
   when the third set includes a plurality of luminance minima, the method further comprises determining whether a distance ($d_i$) between a pair of sequential luminance minima of said plurality of luminance minima in the third set is within a distance threshold.

25. The at least one non-transitory computer readable medium of claim 24, wherein the distance threshold is a threshold distance relationship defined by the expression:

$$W \cdot d_l < d_i < W \cdot d_u$$

in which W is the Width of the input window;
$d_i$ is the distance between the first luminance minima and the second luminance minima; and
$d_l$ and $d_u$ are a lower bound and an upper bound, respectively, and correspond to an average width of a human finger; and
the instructions when executed further cause the performance of the following operations comprising:
   determining the total number of pairs of sequential luminance minima in the third set which satisfy the distance threshold relationship;
   comparing said total number of pairs of sequential luminance minima to a threshold number; and
   when said total number of pairs of sequential luminance minima meets or exceeds the threshold number, identify the at least one scan as a successful scan.

* * * * *